United States Patent
Shinohara

(10) Patent No.: US 7,630,144 B2
(45) Date of Patent: Dec. 8, 2009

(54) ZOOM LENS AND IMAGE PICKUP APPARATUS HAVING ZOOM LENS

(75) Inventor: Kenji Shinohara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/186,399

(22) Filed: Aug. 5, 2008

(65) Prior Publication Data
US 2009/0040624 A1  Feb. 12, 2009

(30) Foreign Application Priority Data
Aug. 6, 2007  (JP) ............................. 2007-203962

(51) Int. Cl.
*G02B 15/14* (2006.01)
(52) U.S. Cl. ....................... 359/687; 359/676
(58) Field of Classification Search ................. 359/687
See application file for complete search history.

(56) References Cited

U.S. PATENT DOCUMENTS

| 4,629,294 | A | * | 12/1986 | Tanaka et al. ............... 359/686 |
| 5,585,966 | A | * | 12/1996 | Suzuki ........................ 359/557 |
| 7,180,682 | B1 | * | 2/2007 | Terada ........................ 359/687 |
| 7,193,790 | B2 | | 3/2007 | Hamano |
| 2002/0063961 | A1 | * | 5/2002 | Hamano et al. ............. 359/557 |
| 2003/0072087 | A1 | * | 4/2003 | Hoshi ......................... 359/687 |
| 2006/0132928 | A1 | * | 6/2006 | Nakatani et al. ............ 359/687 |
| 2007/0091460 | A1 | | 4/2007 | Saruwatari et al. |

FOREIGN PATENT DOCUMENTS

| JP | 2006-113453 | 4/2006 |
| JP | 2006-285019 | 10/2006 |
| JP | 2007-108544 | 4/2007 |

* cited by examiner

*Primary Examiner*—Joseph Martinez
*Assistant Examiner*—James R Greece
(74) *Attorney, Agent, or Firm*—Canon USA Inc IP Div

(57) ABSTRACT

A zoom lens includes, in order from an object side to an image side, first through fourth lens units. The first lens unit has positive refractive power, and the second lens unit has negative refractive power. The third lens unit has positive refractive power, the third lens unit having at least one positive lens and a plurality of negative lenses that include, in order from the object side to the image side, a first positive lens, a first negative lens, and a second negative lens. The fourth lens unit has positive refractive power. The zoom lens performs zooming by changing the distance between the lens units. The first positive lens is a positive lens closest to the object side among the at least one positive lens. The first negative lens is a negative lens closest to the object side among the plurality of negative lenses.

13 Claims, 21 Drawing Sheets

ZOOM LENS AND IMAGE PICKUP APPARATUS HAVING ZOOM LENS

BACKGROUND OF THE INVENTION

1. Field of the Invention

The present invention relates to zoom lenses and image pickup apparatuses having the zoom lenses. The zoom lenses are suitably used in, for example, video cameras, electronic still cameras, broadcast cameras, silver-halide film cameras, and the like.

2. Description of the Related Art

Image pickup apparatuses these days, such as video cameras, digital still cameras, and broadcast cameras, which use solid-state image pickup elements, and silver-halide film cameras, have high performance and compact bodies. There are demands for short, compact, high-resolution zoom lenses that serve as imaging optical systems used with these image pickup apparatuses.

In addition, the zoom lenses are expected to have wide field angles and high zoom ratios.

An example of the zoom lens that meets the above-described demands is a four-unit zoom lens, which has four lens units, namely, in order from the object side to the image side, a first lens unit having positive refractive power, a second lens unit having negative refractive power, a third lens unit having positive refractive power, and a fourth lens unit having positive refractive power.

U.S. Pat. No. 7,193,790, and Japanese Patent Laid-Open No. 2006-113453 disclose rear-focusing four-unit zoom lenses that perform zooming by moving the first, second, and third lens units and correct image plane variation caused by zooming by moving the fourth lens unit.

United States Patent Application Publication No. 2007/0091460 discloses a rear-focusing four-unit zoom lens that vibrates the entire third lens unit in a direction perpendicular to the optical axis to form a still image.

In general, the size of a zoom lens can be reduced by increasing the refractive power of the lens units constituting the zoom lens and reducing the number of lenses.

However, in such a zoom lens, as the refractive power of the surfaces is increased, the thickness of the lenses is also increased. This makes it difficult to sufficiently reduce the length of the zoom lens or correct aberrations.

To obtain high zoom ratio and compact rear-focusing four-unit zoom lenses having high optical performance, it is important to appropriately set the refractive power, configuration, and the like of the lens units.

In particular, unless the refractive power of the third and fourth lens units as well as the configuration of the third lens unit are appropriately set, it is very difficult to produce rear-focusing four-unit zoom lenses having high zoom ratio and high optical performance over the entire zoom range.

SUMMARY OF THE INVENTION

The present invention is directed to a zoom lens and an image pickup apparatus including the zoom lens. According to an aspect of the present invention, a zoom lens includes, in order from an object side to an image side: a first lens unit having positive refractive power; a second lens unit having negative refractive power; a third lens unit having positive refractive power, the third lens unit having at least one positive lens and a plurality of negative lenses that include, in order from the object side to the image side, a first positive lens, a first negative lens, and a second negative lens; and a fourth lens unit having positive refractive power. The zoom lens performs zooming by changing the distance between the lens units. The first positive lens is a positive lens closest to the object side among the at least one positive lens. The first negative lens is a negative lens closest to the object side among the plurality of negative lenses. The zoom lens satisfies the following conditions:

$$0.20 < Da3/TD3 < 0.35$$

$$0.3 < f3/f4 < 1.0$$

where f3 is the focal length of the third lens unit, f4 is the focal length of the fourth lens unit, TD3 is the distance between the surface closest to the object side and the surface closest to the image side in the third lens unit, and Da3 is the distance between the surface of the first positive lens facing the image side and the surface of the first negative lens facing the object side.

Further features of the present invention will become apparent from the following description of exemplary embodiments with reference to the attached drawings.

DESCRIPTION OF THE EMBODIMENTS

The present invention provides a compact zoom lens having high optical performance over the entire zoom range, and an image pickup apparatus having the zoom lens. The zoom lens and the image pickup apparatus having the zoom lens according to embodiments of the present invention will be described.

The zoom lens according to the embodiments has, in order from the object side to the image side, a first lens unit having positive refractive power, a second lens unit having negative refractive power, a third lens unit having positive refractive power, and a fourth lens unit having positive refractive power. The zoom lens performs zooming by changing the distances between the lens units (the distance between the first and second lens units, the distance between the second and third lens units, and the distance between the third and fourth lens units). The zoom lens performs zooming by moving all the lens units, namely, the first, second, third, and fourth lens units. However, as long as the distances between the lens units are changed, it is not necessary to move all the lens units. For example, the zoom lens can perform zooming by changing only the first, second, and third lens units, or, only the second, third, and fourth lens units.

Figure 1:
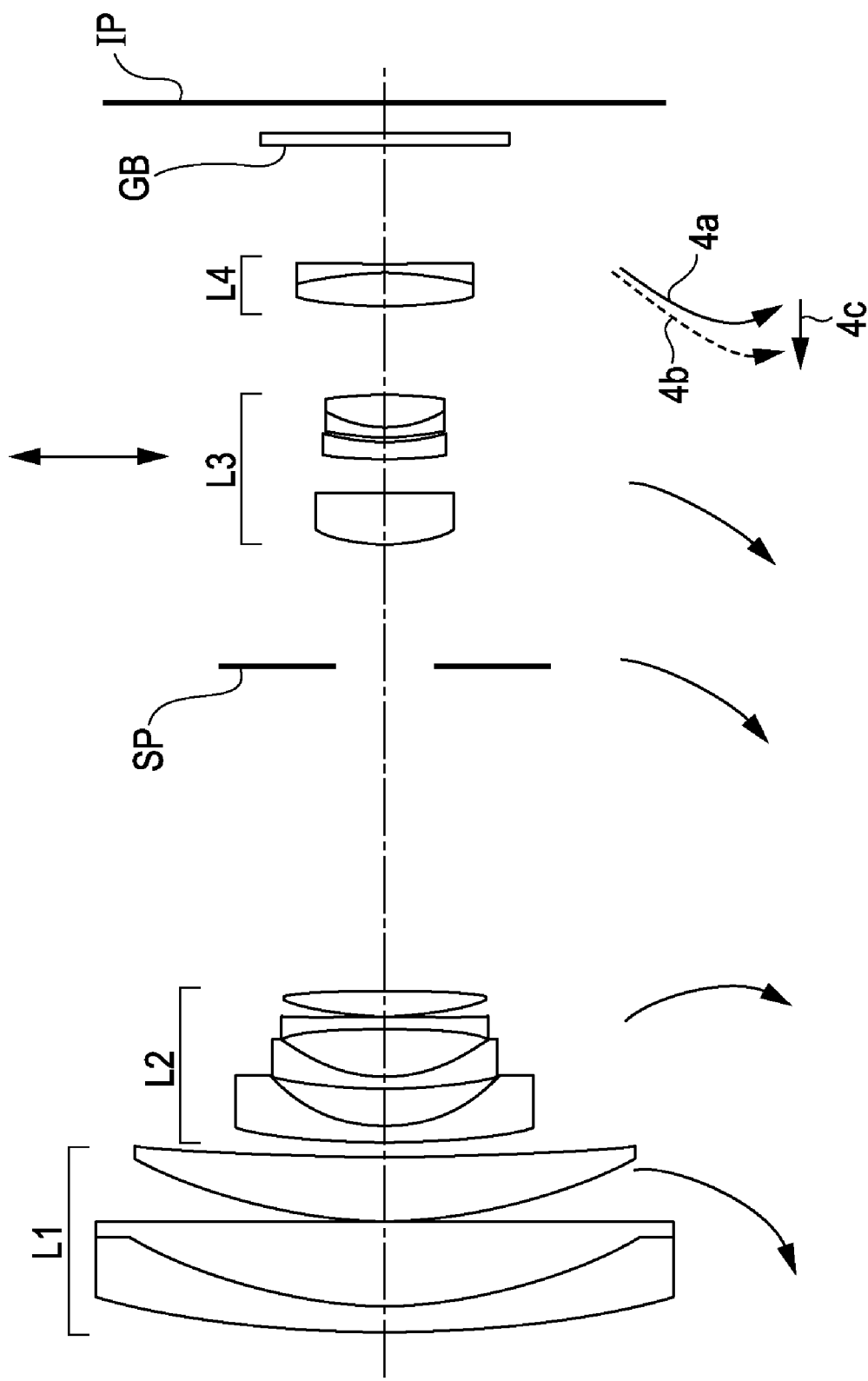
FIG. 1 is a sectional view of a zoom lens according to a first embodiment of the present invention, when set at the wide-angle end.

FIG. 1 is a sectional view of a zoom lens according to a first embodiment of the present invention, when set at the wide-angle end (short focal length).

Figure 2:
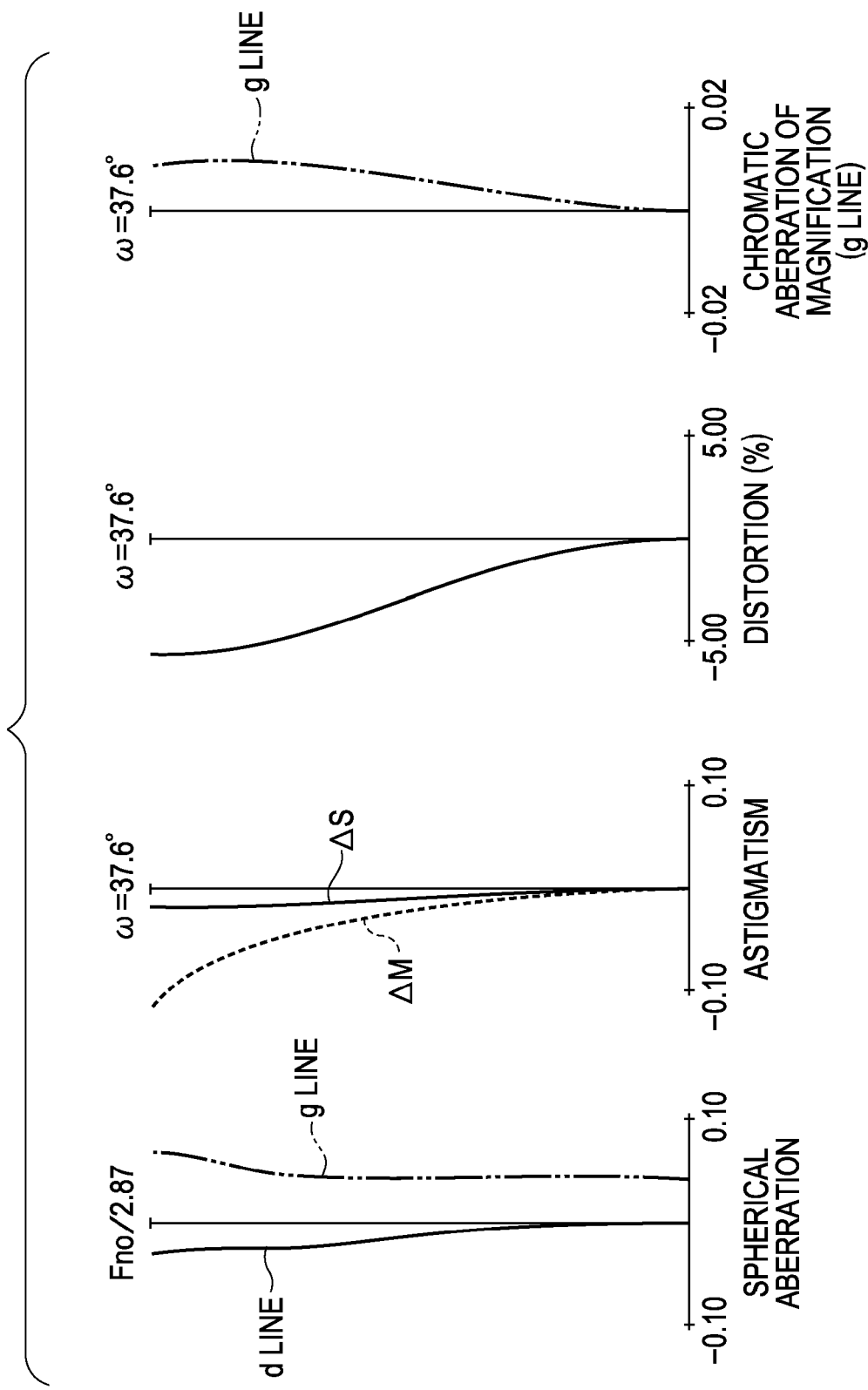
FIG. 2 shows aberration diagrams of the zoom lens according to the first embodiment (Numerical Example 1) of the present invention, when set at the wide-angle end.
Figure 3:
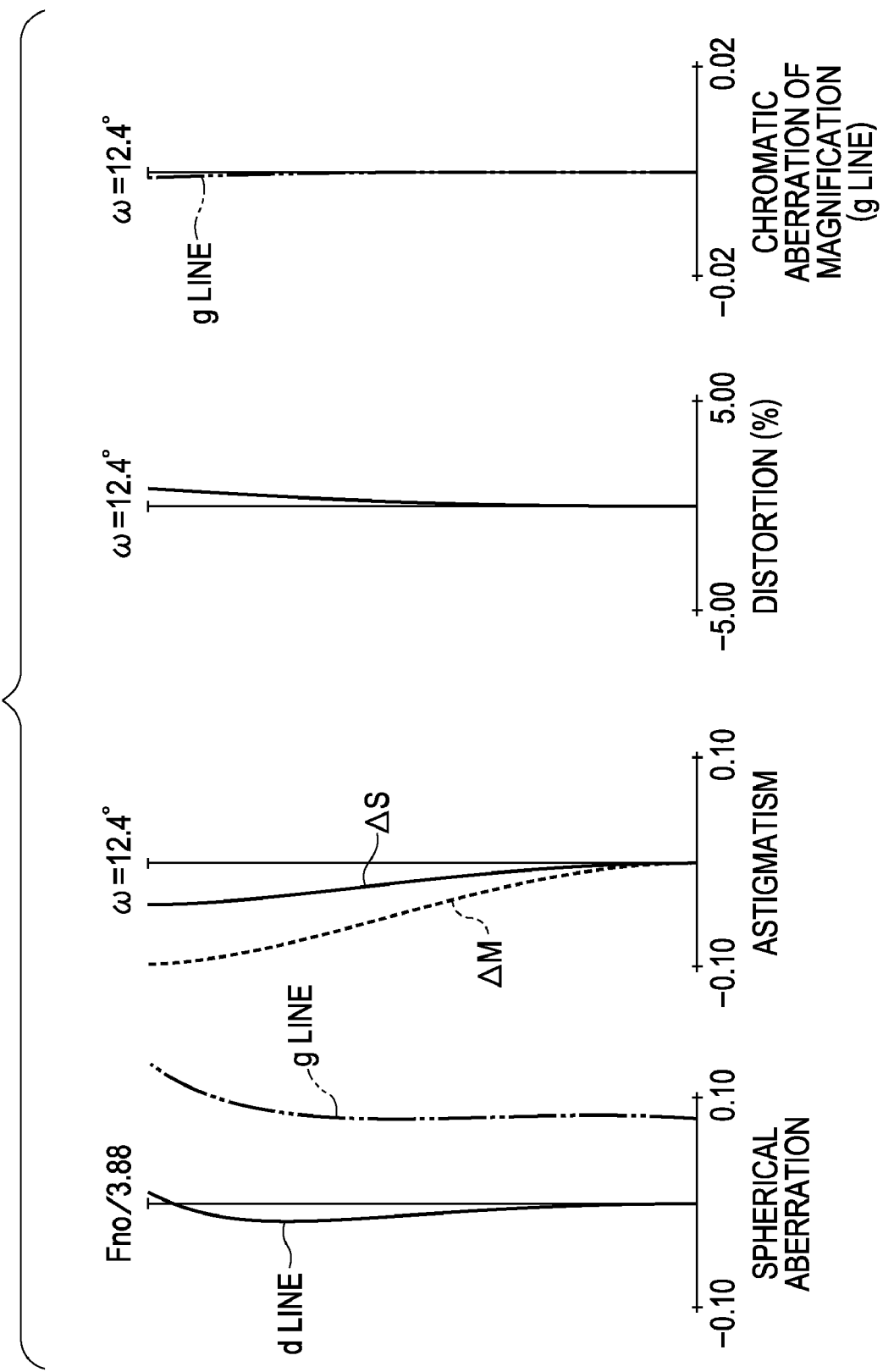
FIG. 3 shows aberration diagrams of the zoom lens according to the first embodiment (Numerical Example 1) of the present invention, when set at a middle zooming position.
Figure 4:
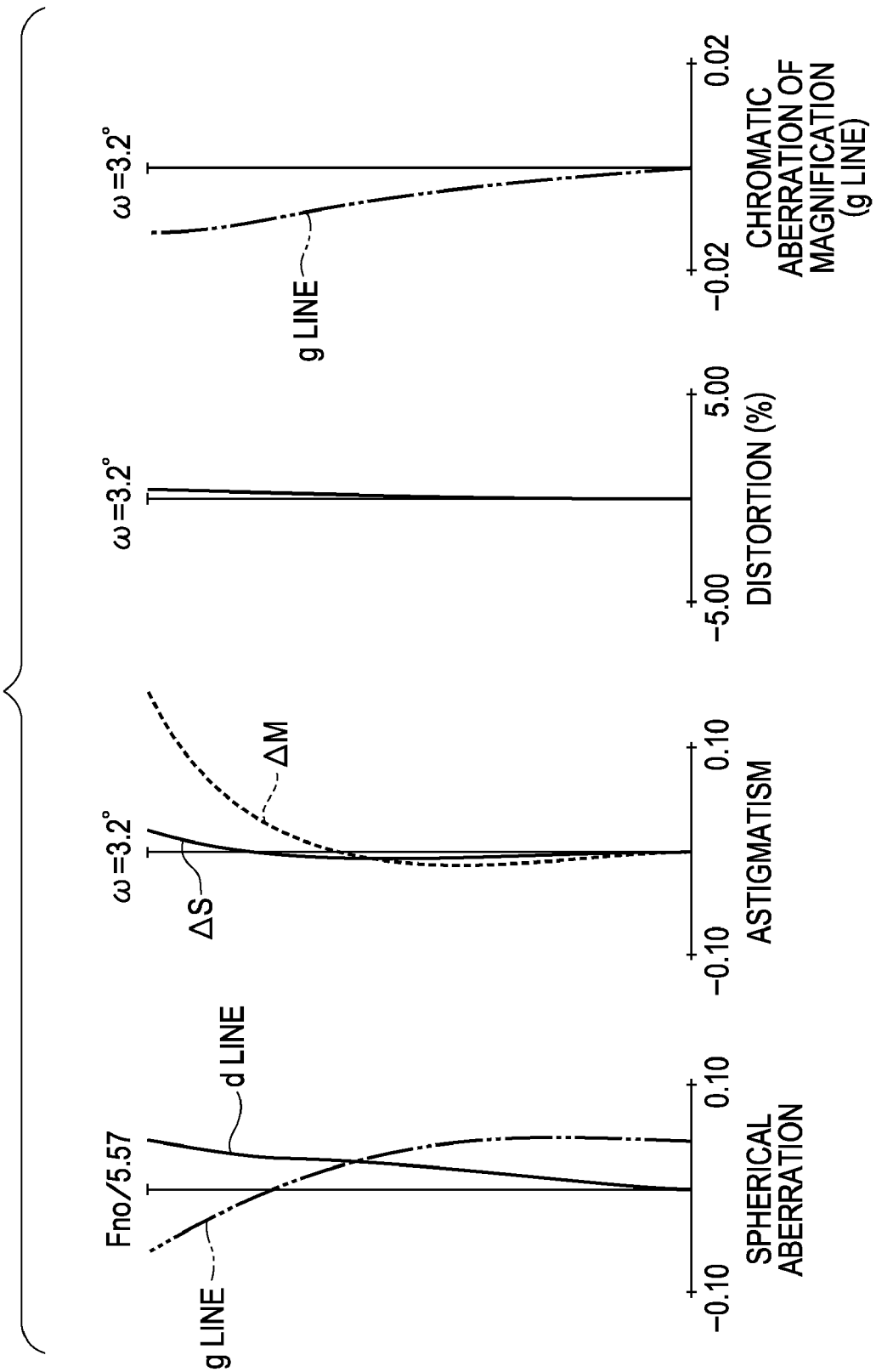
FIG. 4 is shows aberration diagrams of the zoom lens according to the first embodiment (Numerical Example 1) of the present invention, when set at the telephoto end.

FIGS. 2, 3, and 4 each show aberration diagrams of the zoom lens according to the first embodiment, when set at the wide-angle end, the middle zooming position, and the telephoto end (long focal length), respectively.

Figure 5:
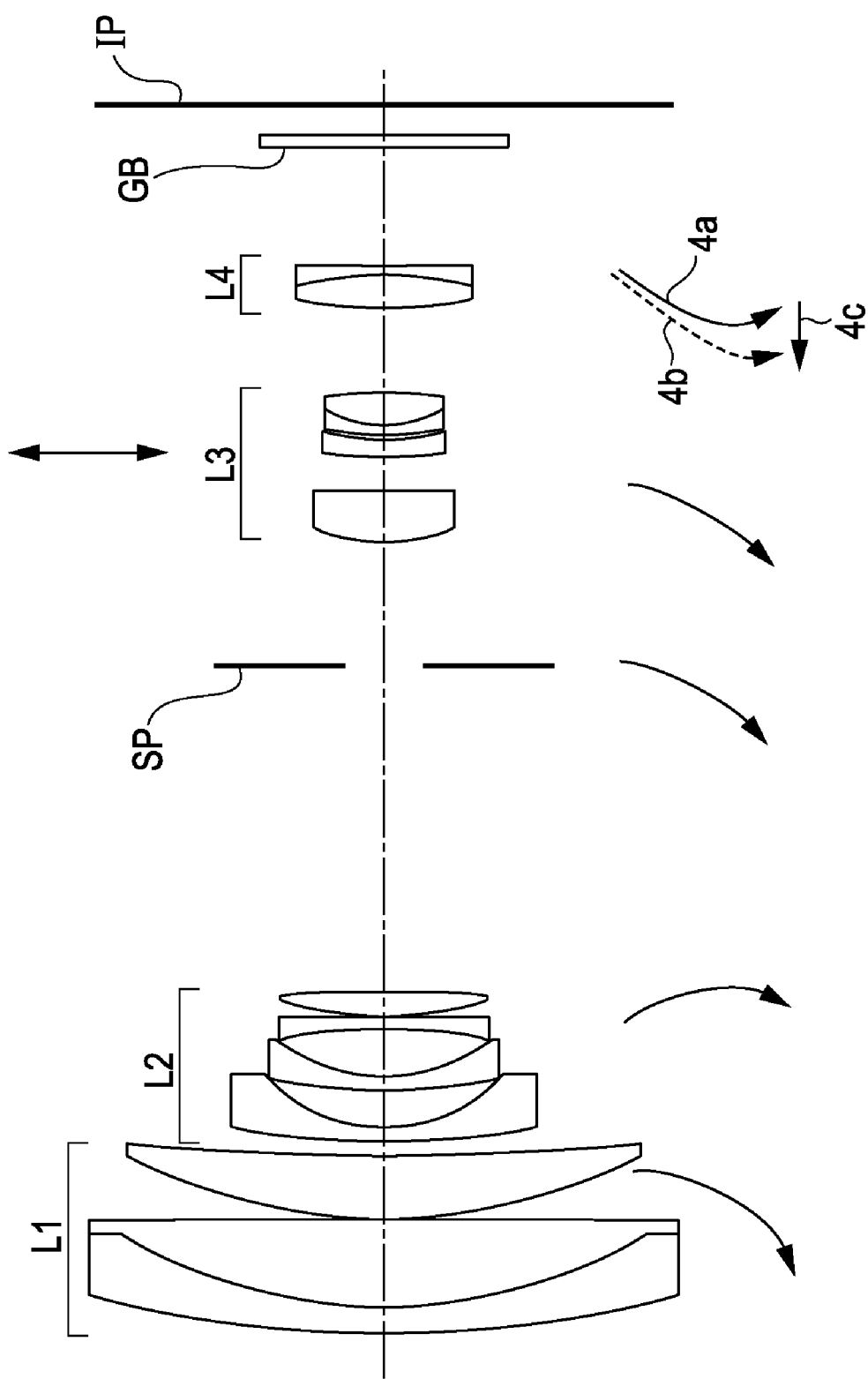
FIG. 5 is a sectional view of a zoom lens according to a second embodiment of the present invention, when set at the wide-angle end.
Figure 6:
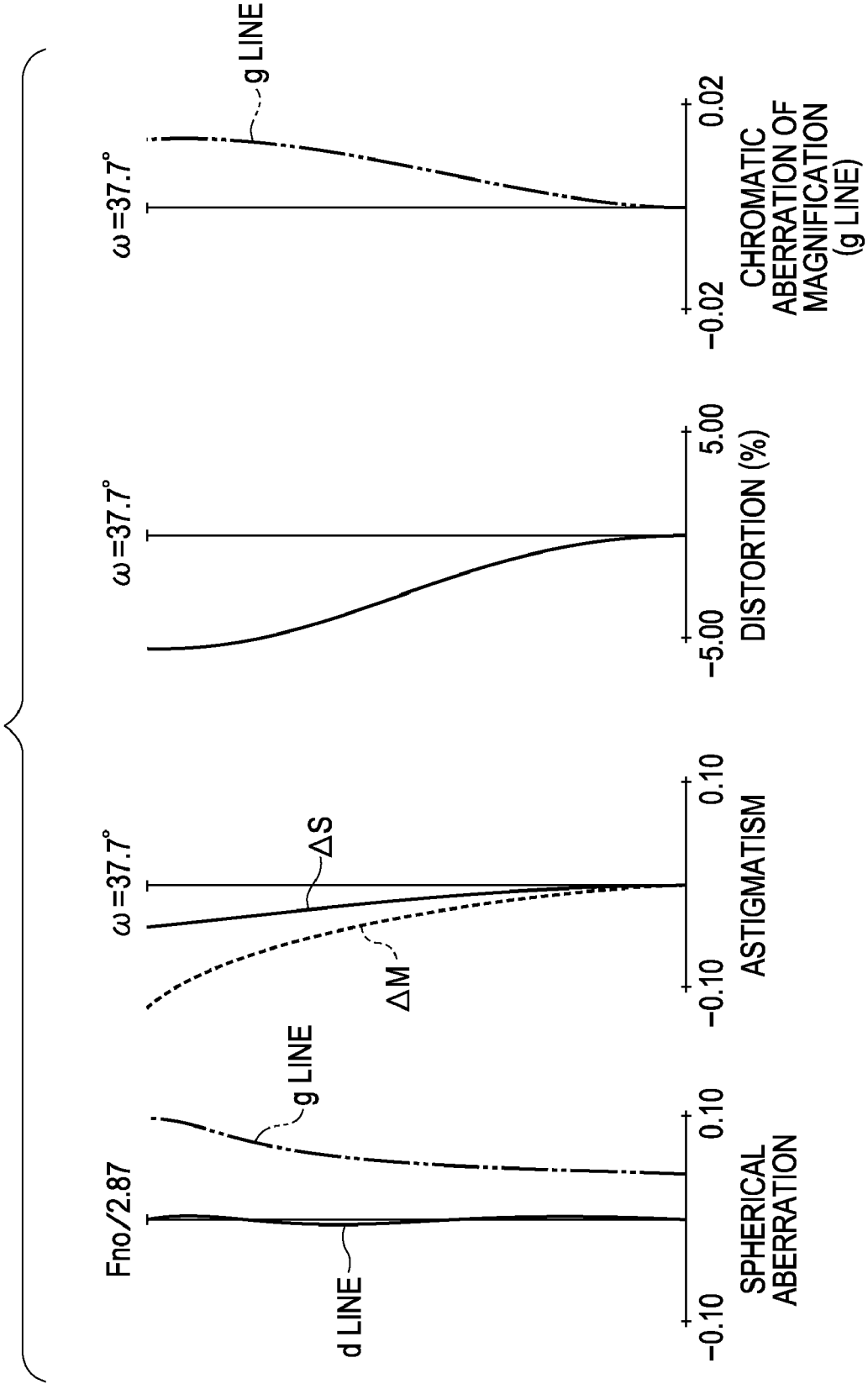
FIG. 6 shows aberration diagrams of the zoom lens according to the second embodiment (Numerical Example 2) of the present invention, when set at the wide-angle end.
Figure 7:
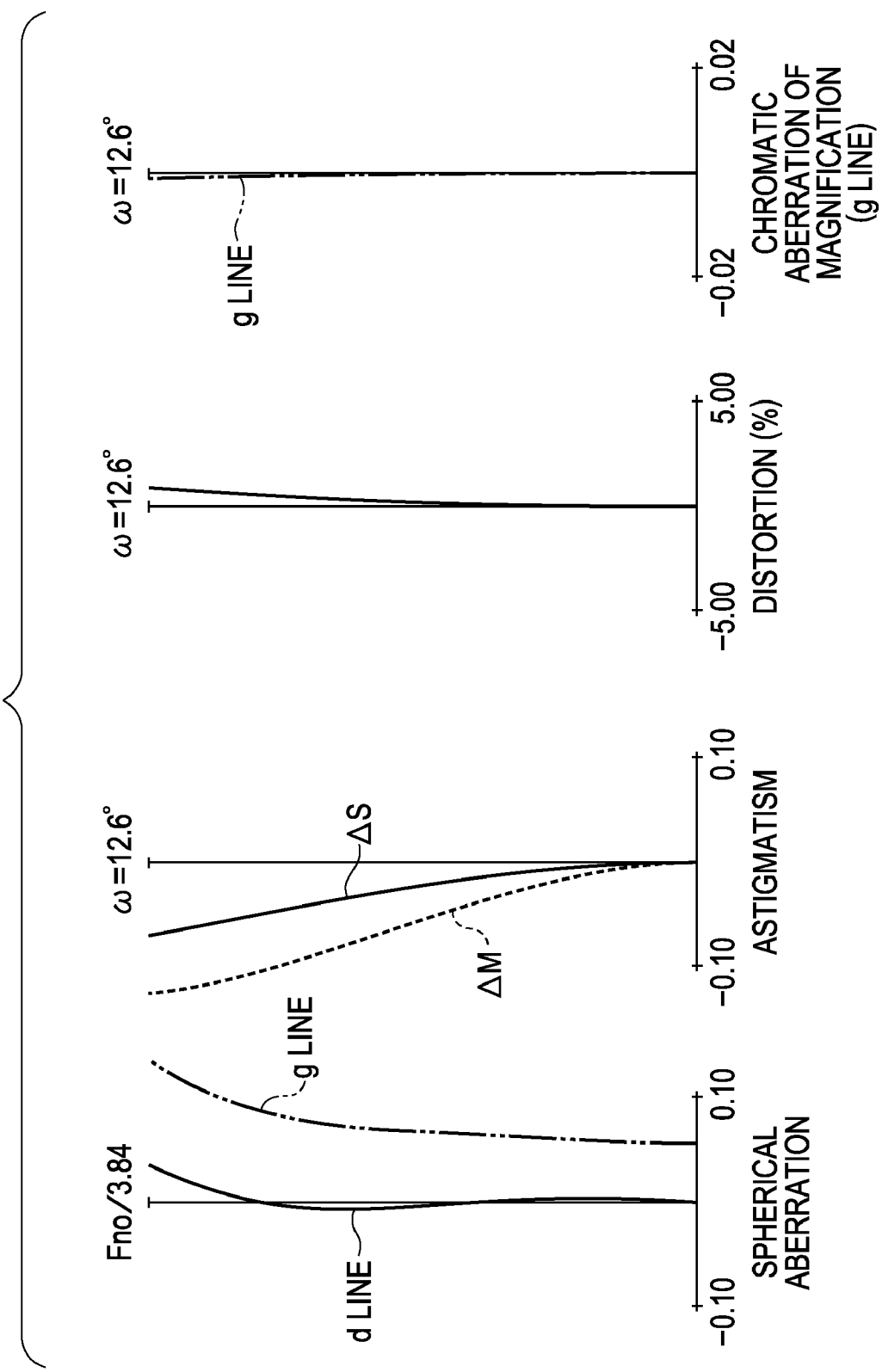
FIG. 7 shows aberration diagrams of the zoom lens according to the second embodiment (Numerical Example 2) of the present invention, when set at a middle zooming position.
Figure 8:
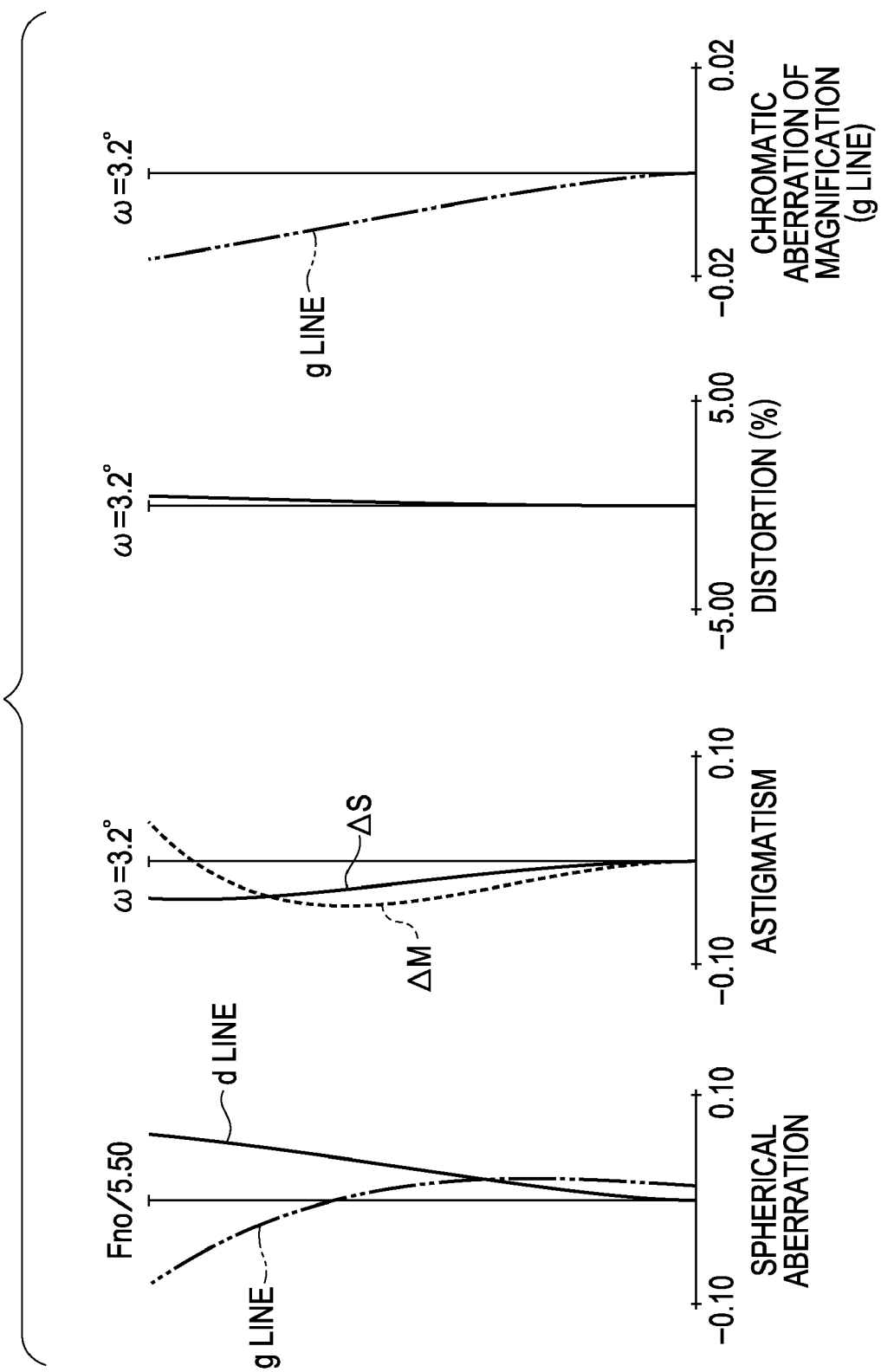
FIG. 8 shows aberration diagrams of the zoom lens according to the second embodiment (Numerical Example 2) of the present invention, when set at the telephoto end.

FIG. 5 is a sectional view of a zoom lens according to a second embodiment of the present invention, when set at the wide-angle end. FIGS. 6, 7, and 8 each show aberration diagrams of the zoom lens according to the second embodiment, when set at the wide-angle end, the middle zooming position, and the telephoto end, respectively.

Figure 9:
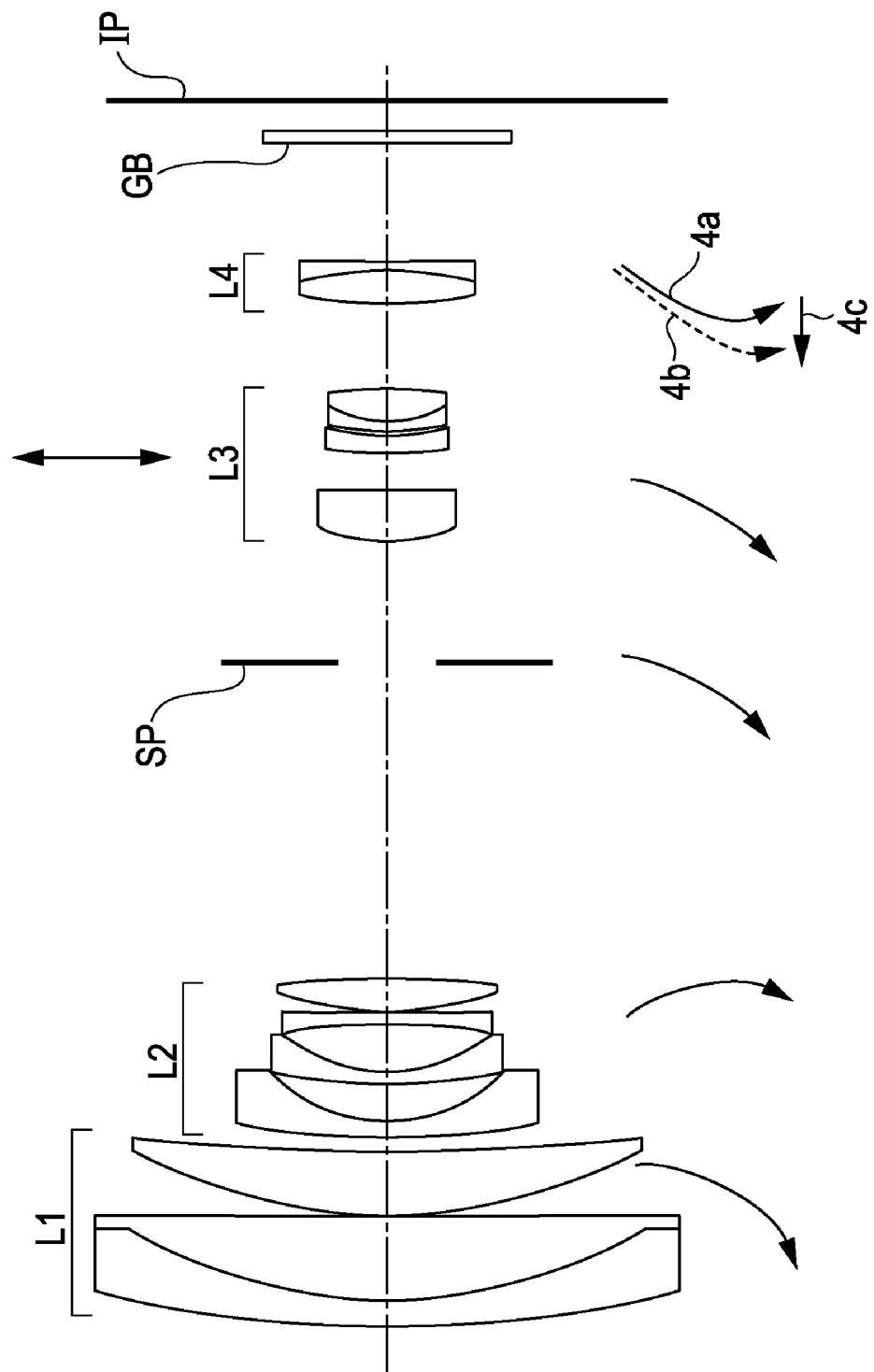
FIG. 9 is a sectional view of a zoom lens according to a third embodiment of the present invention, when set at the wide-angle end.
Figure 10:
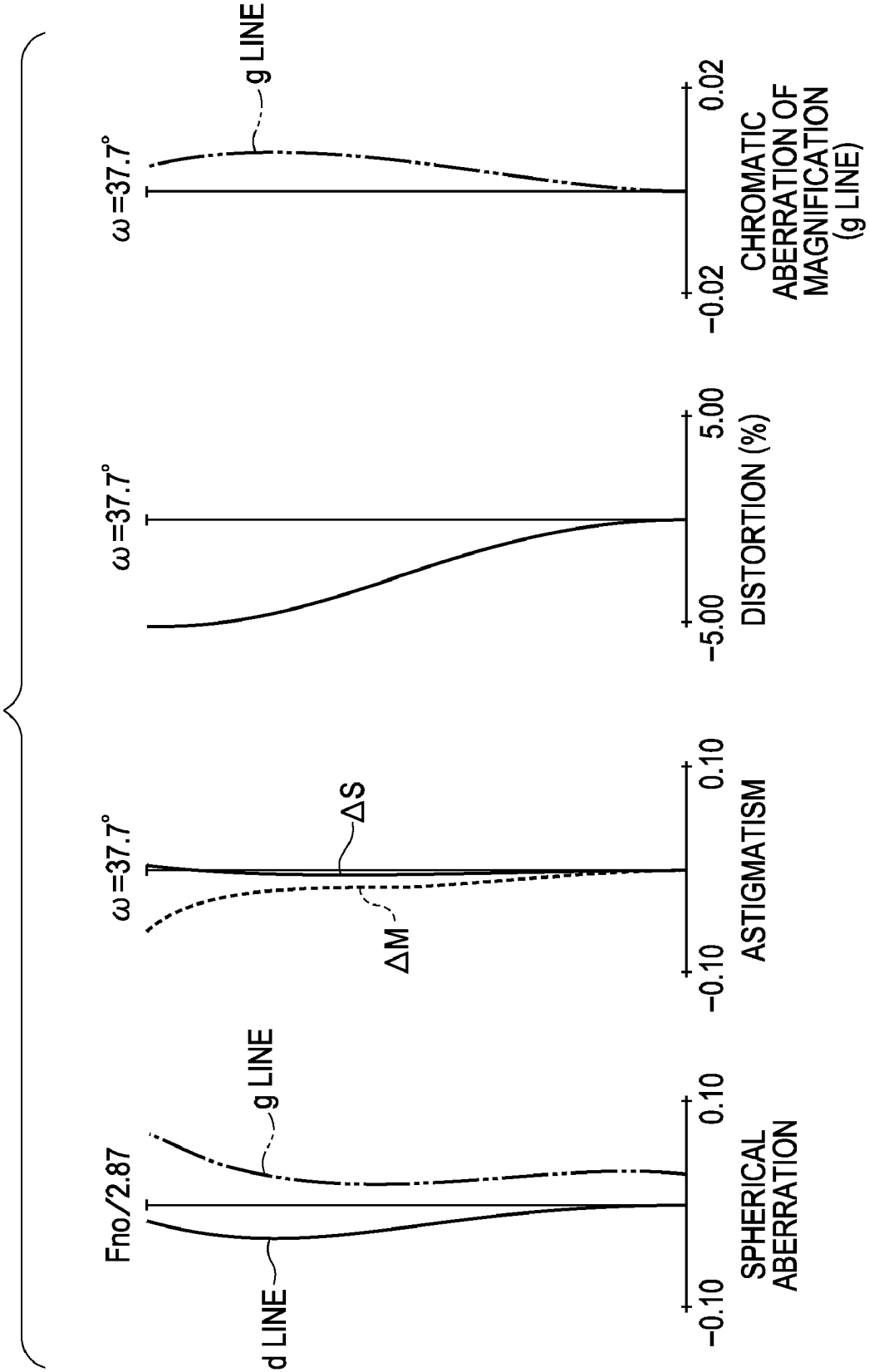
FIG. 10 shows aberration diagrams of the zoom lens according to the third embodiment (Numerical Example 3) of the present invention, when set at the wide-angle end.
Figure 11:
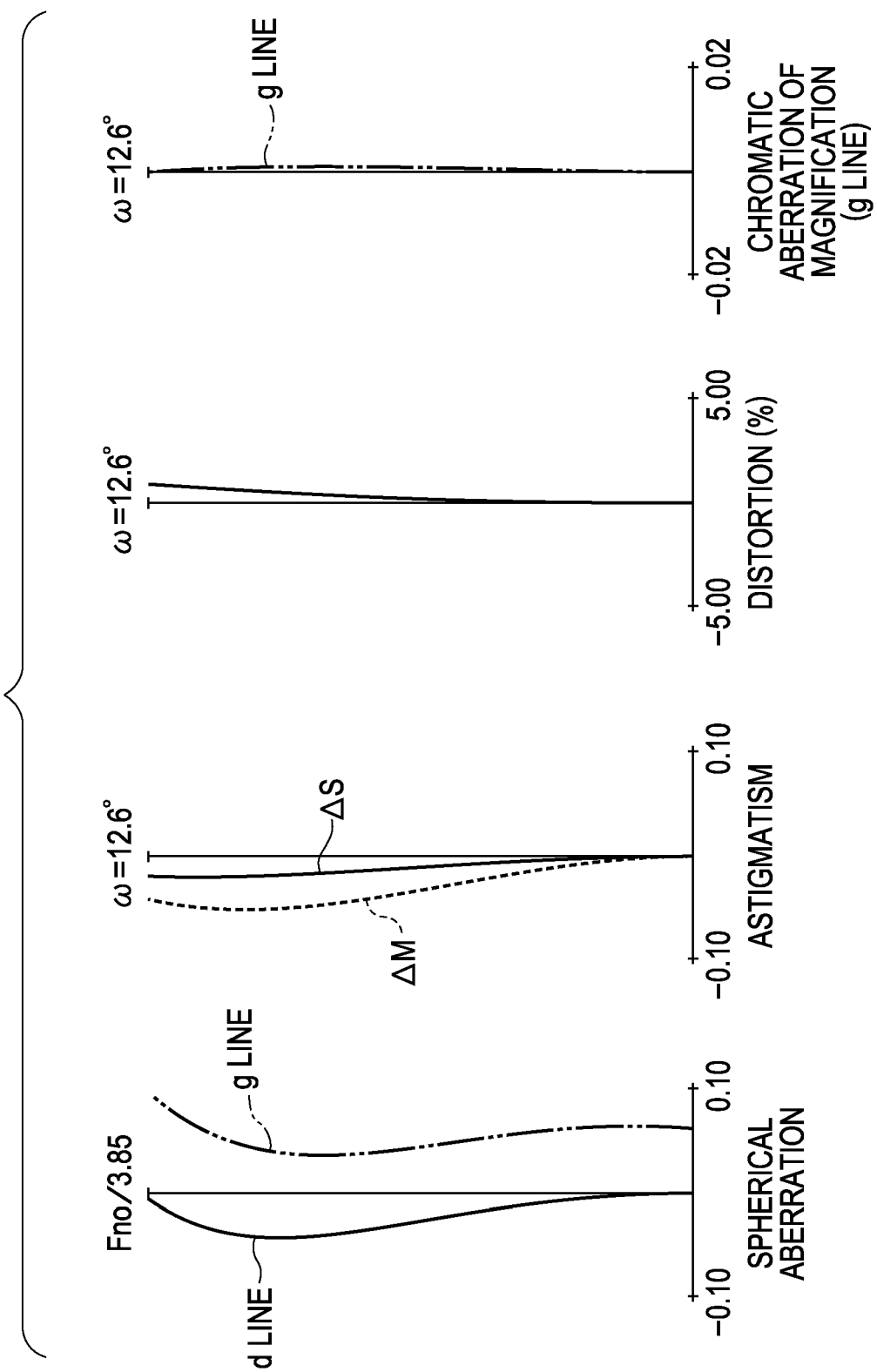
FIG. 11 shows aberration diagrams of the zoom lens according to the third embodiment (Numerical Example 3) of the present invention, when set at a middle zooming position.
Figure 12:
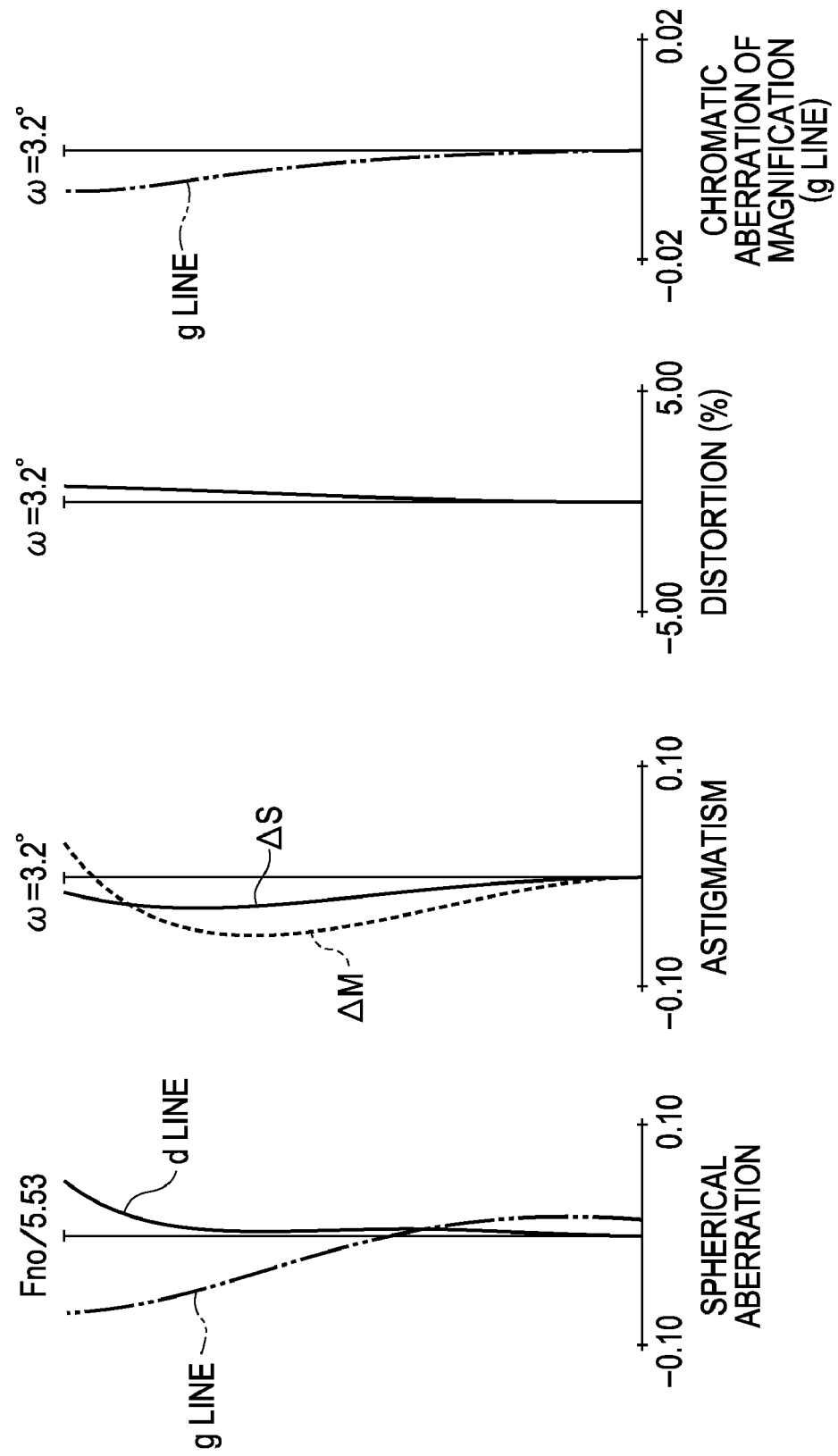
FIG. 12 shows aberration diagrams of the zoom lens according to the third embodiment (Numerical Example 3) of the present invention, when set at the telephoto end.

FIG. 9 is a sectional view of a zoom lens according to a third embodiment of the present invention, when set at the wide-angle end. FIGS. 10, 11, and 12 each show aberration diagrams of the zoom lens according to the third embodiment, when set at the wide-angle end, the middle zooming position, and the telephoto end, respectively.

Figure 13:
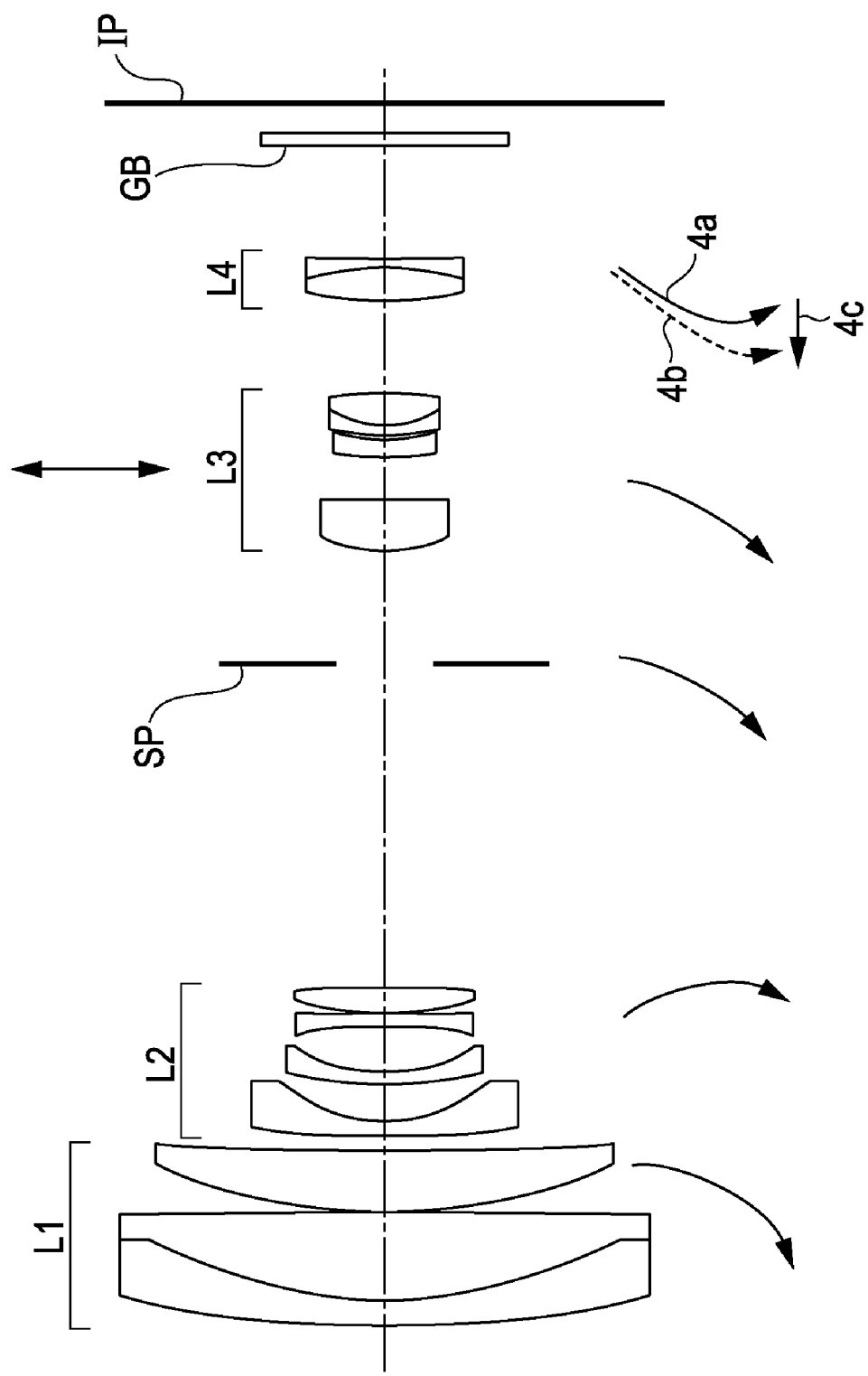
FIG. 13 is a sectional view of a zoom lens according to a fourth embodiment of the present invention, when set at the wide-angle end.
Figure 14:
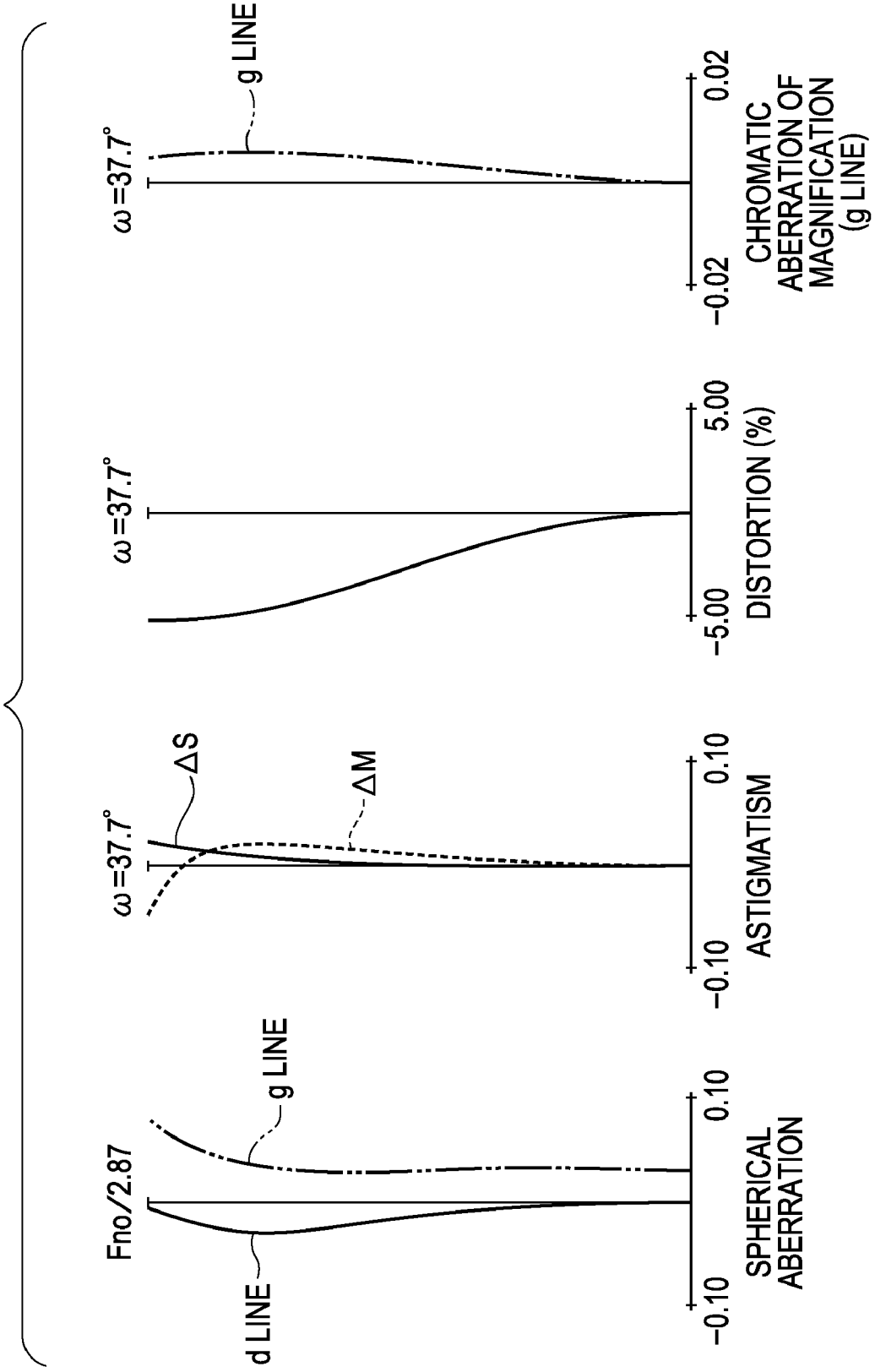
FIG. 14 shows aberration diagrams of the zoom lens according to the fourth embodiment (Numerical Example 4) of the present invention, when set at the wide-angle end.
Figure 15:
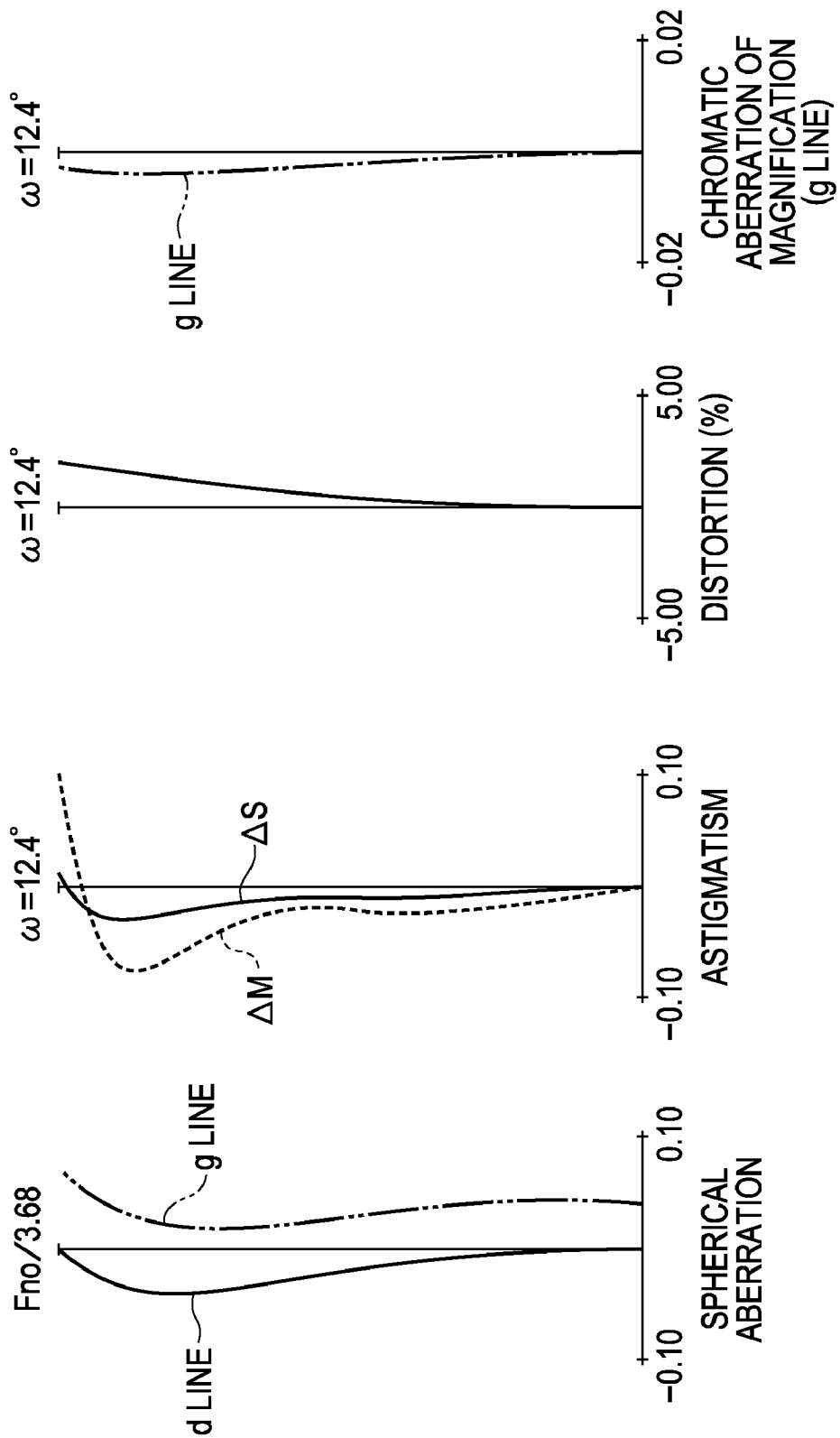
FIG. 15 shows aberration diagrams of the zoom lens according to the fourth embodiment (Numerical Example 4) of the present invention, when set at a middle zooming position.
Figure 16:
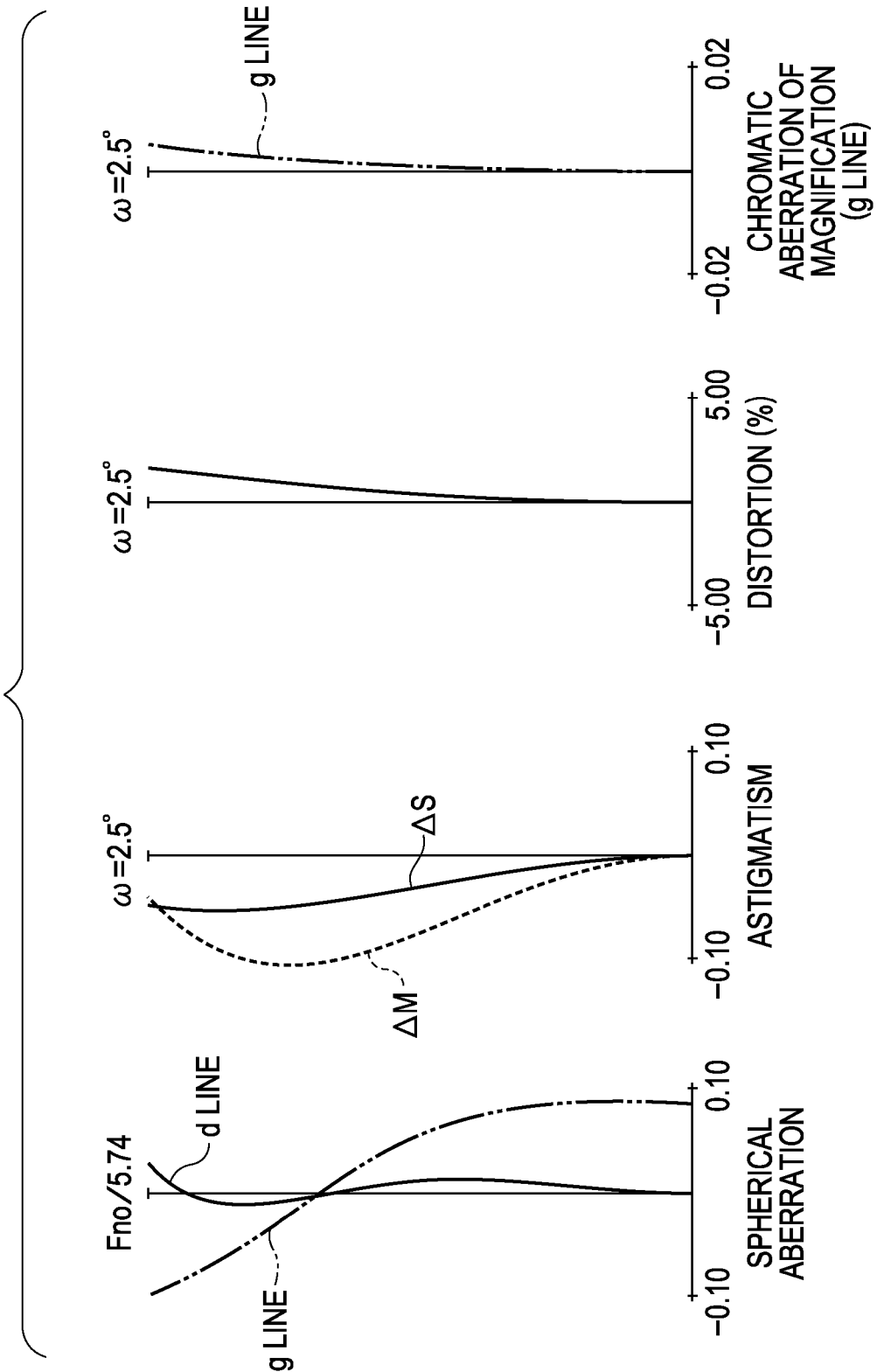
FIG. 16 shows aberration diagrams of the zoom lens according to the fourth embodiment (Numerical Example 4) of the present invention, when set at the telephoto end.

FIG. 13 is a sectional view of a zoom lens according to a fourth embodiment of the present invention, when set at the wide-angle end. FIGS. 14, 15, and 16 each show aberration diagrams of the zoom lens according to the fourth embodiment, when set at the wide-angle end, the middle zooming position, and the telephoto end, respectively.

Figure 17:
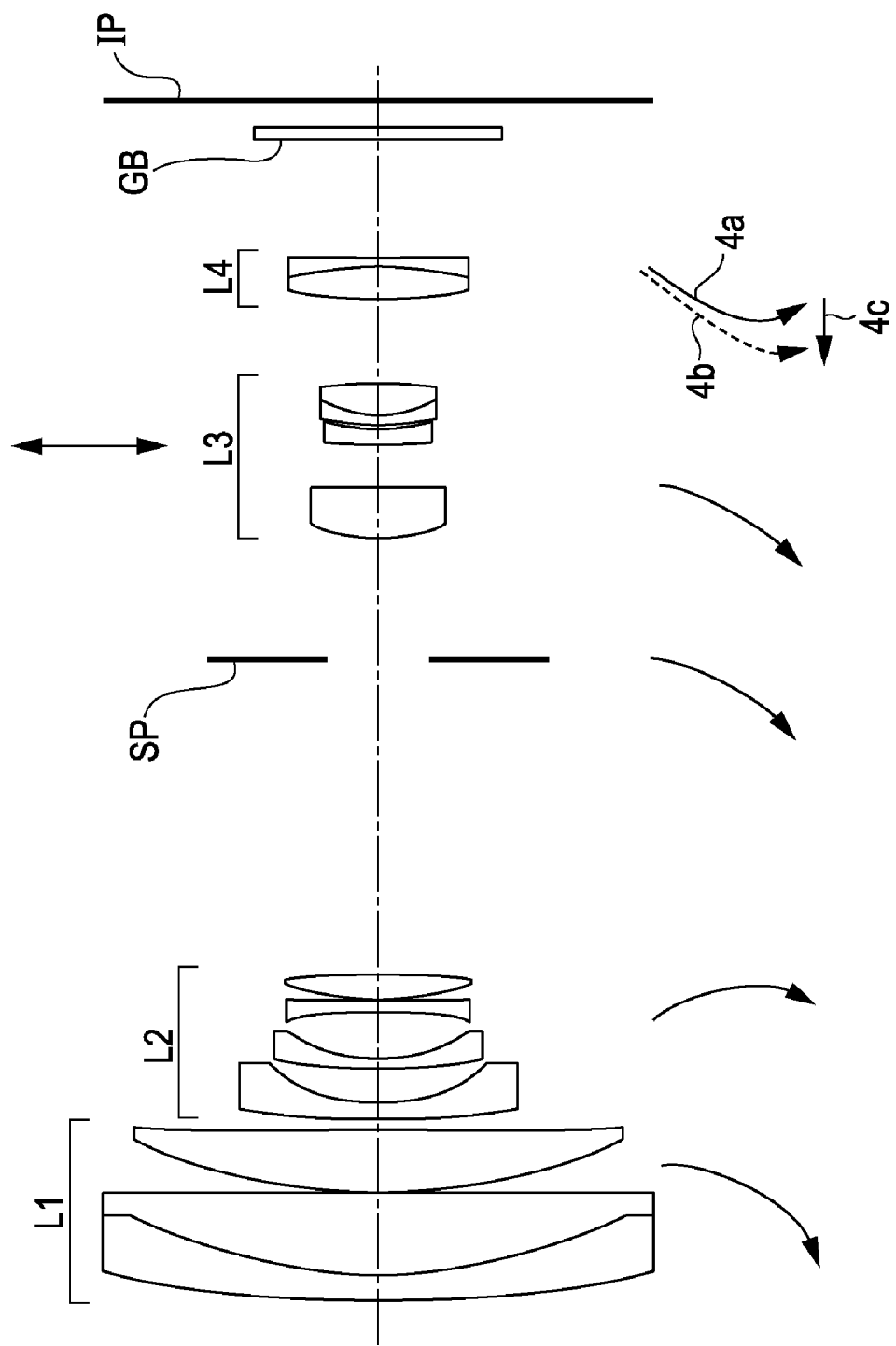
FIG. 17 is a sectional view of a zoom lens according to a fifth embodiment of the present invention, when set at the wide-angle end.
Figure 18:
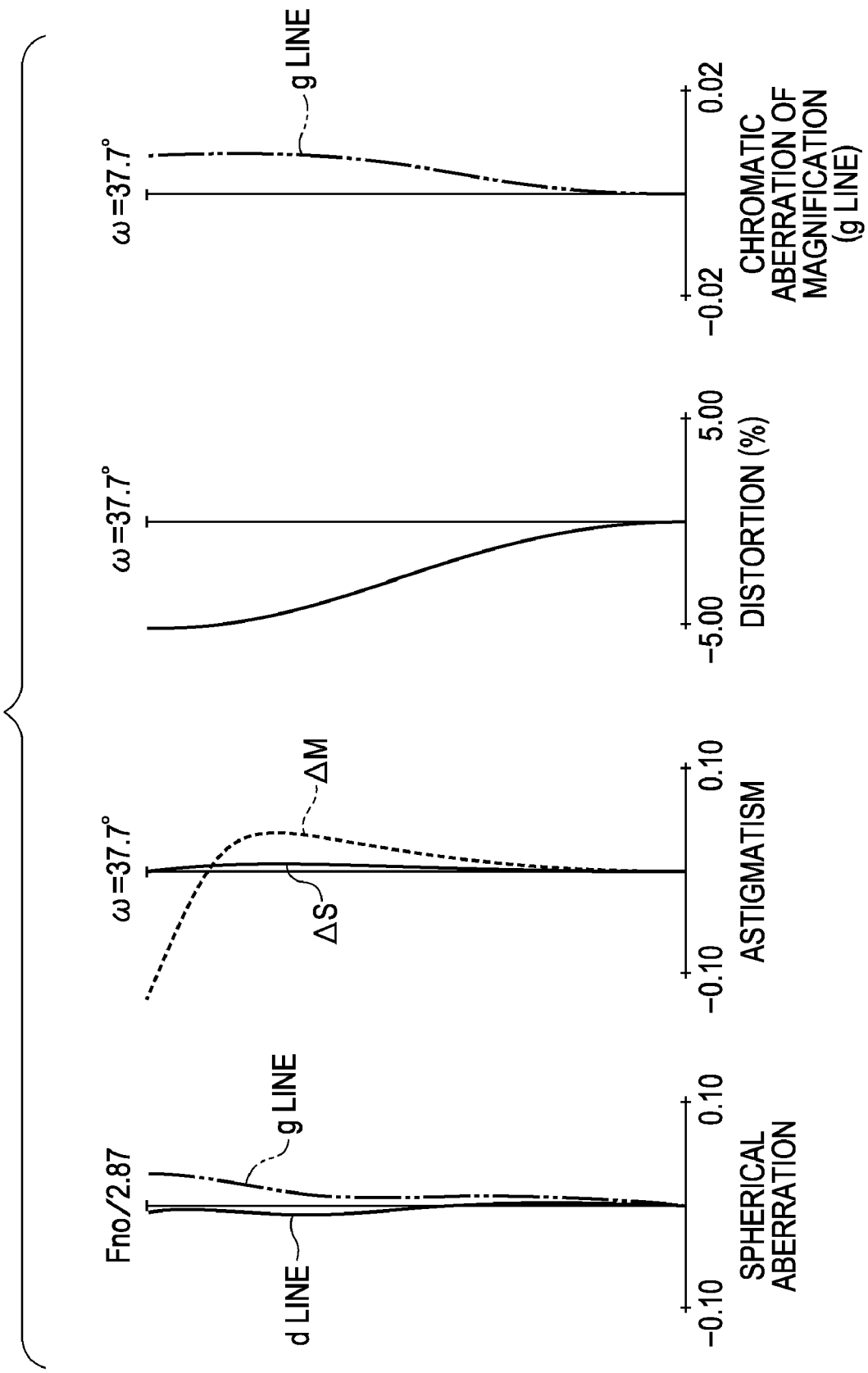
FIG. 18 shows aberration diagrams of the zoom lens according to the fifth embodiment (Numerical Example 5) of the present invention, when set at the wide-angle end.
Figure 19:
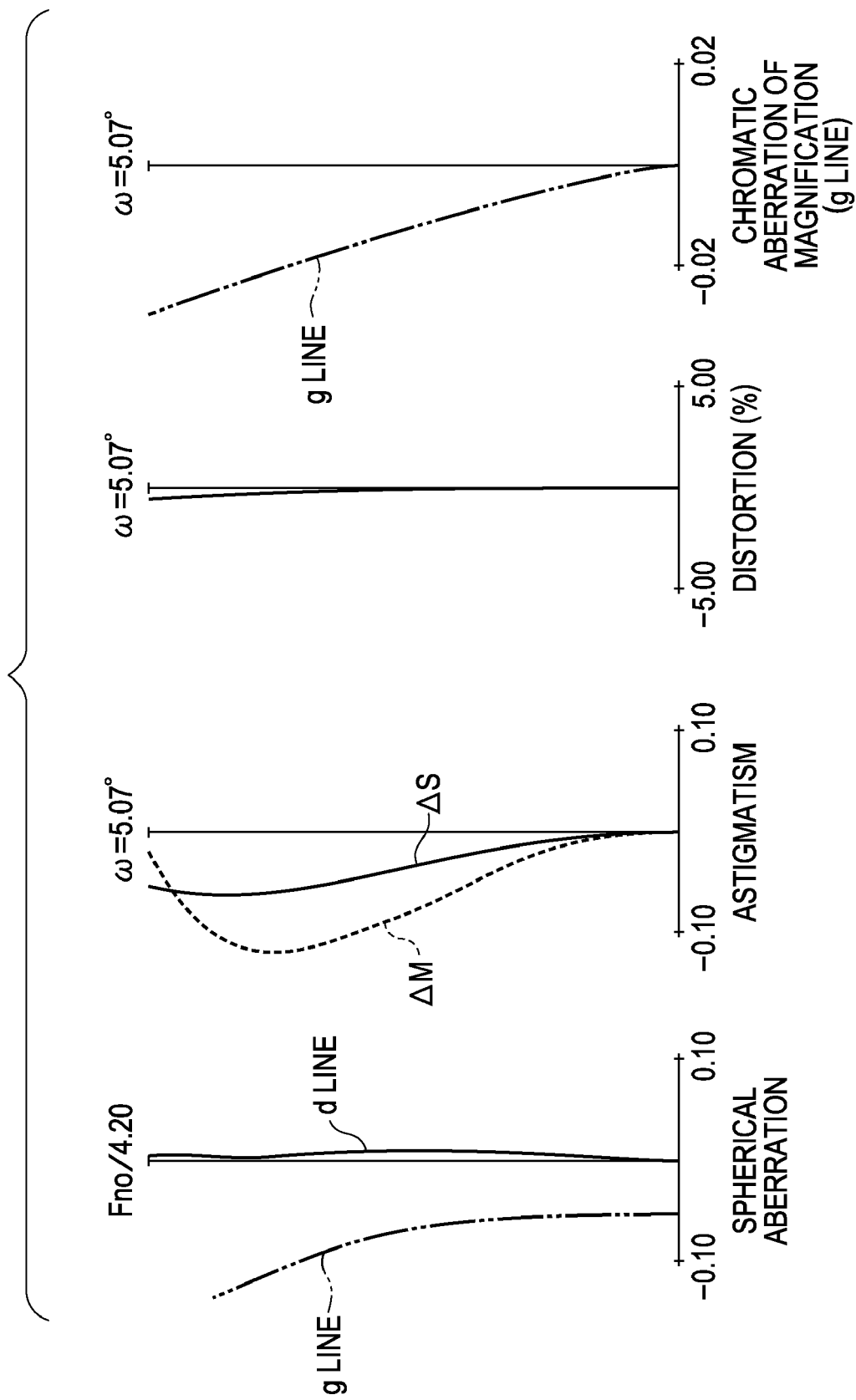
FIG. 19 shows aberration diagrams of the zoom lens according to the fifth embodiment (Numerical Example 5) of the present invention, when set at a middle zooming position.
Figure 20:
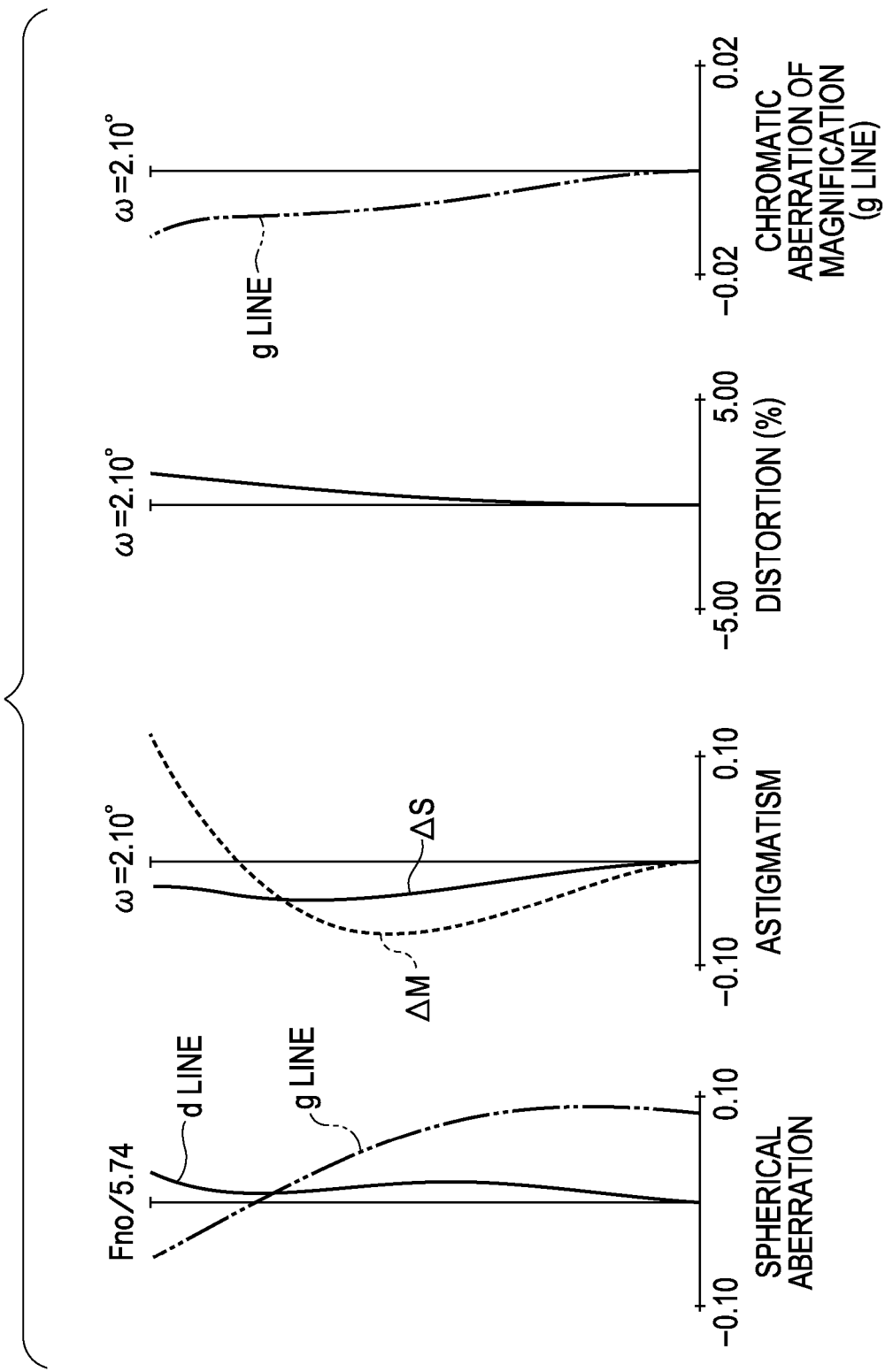
FIG. 20 shows aberration diagrams of the zoom lens according to the fifth embodiment (Numerical Example 5) of the present invention, when set at the telephoto end.

FIG. 17 is a sectional view of a zoom lens according to a fifth embodiment of the present invention, when set at the wide-angle end. FIGS. 18, 19, and 20 each show aberration diagrams of the zoom lens according to the fifth embodiment, when set at the wide-angle end, the middle zooming position, and the telephoto end, respectively.

Figure 21:
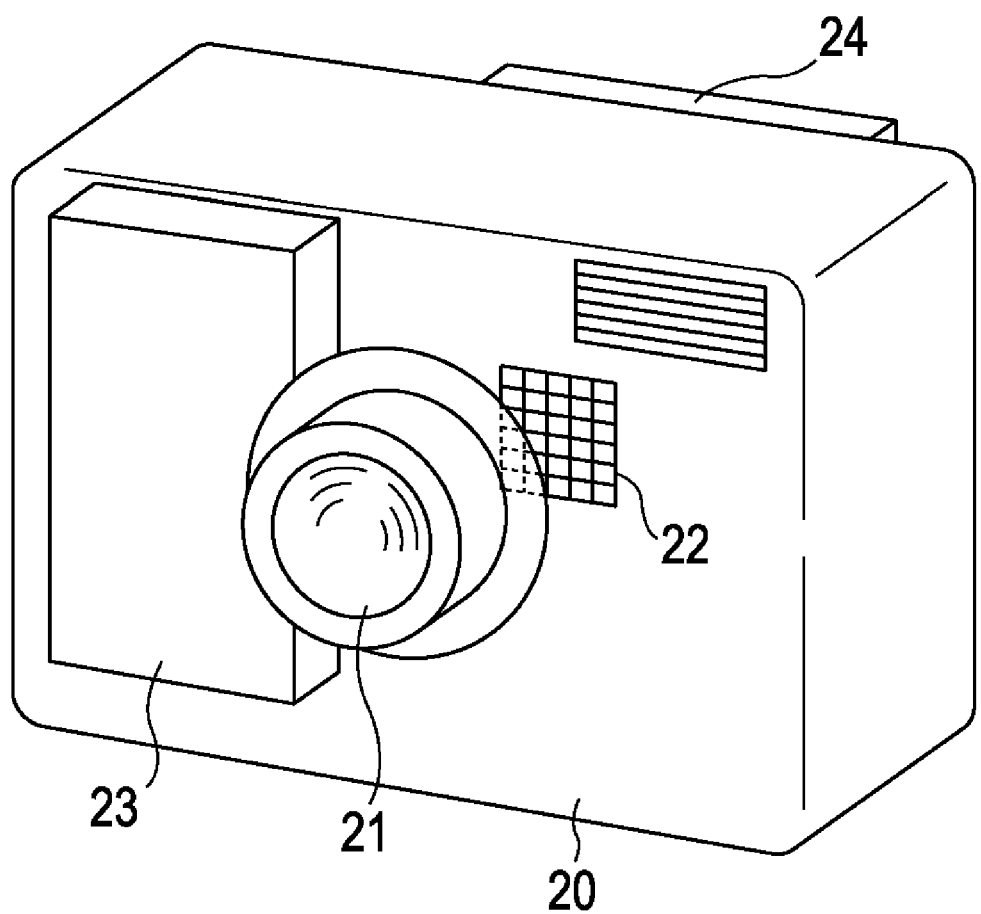
FIG. 21 is a schematic view of an image pickup apparatus of the present invention.

FIG. 21 is a schematic view of a relevant part of a camera (image pickup apparatus) having the zoom lens of the present invention. The zoom lens according to the embodiments is an imaging optical system used with an image pickup apparatus, such as a video camera, a digital camera, or a silver-halide film camera.

In the sectional views of the zoom lens, left side corresponds to the object side (front side), right side corresponds to the image side (rear side), i is the lens unit number counted from the object side, and Li is the i-th lens unit.

The sectional views of the zoom lens each show a first lens unit L1 having positive refractive power or optical power, which is the reciprocal of the focal length, a second lens unit L2 having negative refractive power, a third lens unit L3 having positive refractive power, and a fourth lens unit L4 having positive refractive power.

An aperture stop SP is located to the object side of the third lens unit L3. An optical block GB corresponds to an optical filter, a face plate, a crystal optical low-pass filter, or an infrared cut filter.

When the zoom lens is used as the imaging optical system of a video camera or a digital still camera, an image plane IP corresponds to the image pickup area of a solid-state image pickup element (photoelectric conversion element), such as a charge-coupled device (CCD) sensor or a complementary metal-oxide semiconductor (CMOS) sensor. When the zoom lens is used as the imaging optical system of a silver-halide film camera, the image plane IP corresponds to the photosurface, i.e., the film surface.

The aberration diagrams show the spherical aberrations with respect to the d line and the g line, the astigmatisms on the meridional image plane ΔM and the sagittal image plane ΔS, and the chromatic aberration of magnification with respect to the g line. In the aberration diagrams, ω is the half field angle, and Fno is the F number.

In the following embodiments, the terms "wide-angle end" and "telephoto end" refer to the zooming positions in which the lens units for zooming are positioned at both ends of the optical axis along which the lens unit can mechanically move.

In the embodiments, when the zoom lens zooms from the wide-angle end to the telephoto end, the lens units and the aperture stop SP are moved as indicated by the arrows.

More specifically, during zooming, the first lens unit L1 moves such that the position of the first lens unit L1 at the telephoto end is closer to the object side than the position of the first lens unit L1 at the wide-angle end.

The second lens unit L2 is moved along a locus convex toward the image side. The third lens unit L3 is moved toward the object side. The fourth lens unit L4 is moved along a locus convex toward the object side. The aperture stop SP is moved toward the object side independently of the lens units.

When the zoom lens zooms from the wide-angle end to the telephoto end, the first lens unit L1 and the third lens unit L3 are move toward the object side. This provides the zoom lens with a large zoom ratio while maintaining the compactness in length of the zoom lens when set at the wide-angle end.

In particular, in the embodiments, when the zoom lens performs zooming, the third lens unit L3 is moved toward the object side. This allows the third lens unit L3 and the fourth lens unit L4 to share the zooming ratio therebetween. Further, the first lens unit having positive refractive power L1 is moved toward the object side. This allows the second lens unit L2 to produce a great zooming effect. Thus, a high zoom ratio is provided without largely increasing the refractive powers of the first lens unit L1 and the second lens unit L2.

The zoom lens according to the embodiments is of a rear-focusing type, in which focusing is performed by moving the fourth lens unit L4 along the optical axis.

When the zoom lens set at the telephoto end shifts focus from an object at infinity to an object at a short distance, the fourth lens unit L4 is moved toward the front side as indicated by the arrow 4c in the sectional views of the zoom lens. The solid curved arrow 4a indicates the locus of movement of the fourth lens unit L4 for correcting image plane variation that occurs when the zoom lens focused on an object at infinity zooms from the wide-angle end to the telephoto end. The dashed curved arrow 4b indicates the locus of movement of the fourth lens unit L4 for correcting image plane variation that occurs when the zoom lens focused on an object at a short distance zooms from the wide-angle end to the telephoto end.

As shown, by moving the fourth lens unit L4 along a locus convex toward the object side, the space between the third lens unit L3 and the fourth lens unit L4 is effectively utilized, whereby the total length of the zoom lens can be effectively reduced.

In the embodiments, the fourth lens unit L4, which is light in weight, is moved for focusing so as to allow the zoom lens to easily perform quick focusing and, for example, quick auto focusing.

Although the first lens unit L1 does not move in the optical axis direction for focusing, it may be moved independently or together with the fourth lens unit L4 if necessary for correcting aberrations.

In the embodiments, the entire or a part (the three lenses excluding the lens closest to the object side, or the cemented lens) of the third lens unit L3 is moved in a direction having a component perpendicular to the optical axis in order to correct the position of a captured image when the entire zoom lens is shaken. In other words, image blur (variation in image plane position on the image pickup element) is corrected by changing the position of the image of a subject.

In the embodiments, the aperture stop SP moves independently of the lens units when the zoom lens performs zooming. This enables the entrance pupil to be positioned on the object side in the wide-angle region, thereby preventing the diameter of the front lens (the effective diameter of the first lens unit) from increasing.

In the embodiments, the third lens unit L3 has a lens arrangement including, in order from the object side to the image side, a positive lens and a negative lens, and has at least two negative lenses in total. More specifically, the third lens unit L3 has, in order from the object side to the image side, a positive lens (a first positive lens), a negative lens (a first negative lens), a negative lens (a second negative lens), and a positive lens (a second positive lens). Alternatively, the third lens unit L3 may have, in order from the object side to the image side, a positive lens (a first positive lens), a negative lens (a first negative lens), a positive lens (a second positive lens), and a negative lens (a second negative lens).

The zoom lens of the present invention satisfies the following Conditional Expressions:

$$0.20 < Da3/TD3 < 0.35 \quad (1)$$

$$0.3 < f3/f4 < 1.0 \quad (2)$$

where f3 is the focal length of the third lens unit L3; f4 is the focal length of the fourth lens unit L4; TD3 is the distance between the surface closest to the object side and the surface closest to the image side in the third lens unit L3; and Da3 is the distance between the surface of the positive lens closest to the object side facing the image side and the surface of the negative lens closest to the object side facing the object side in the third lens unit L3.

Conditional Expression (1) concerns the total thickness of the third lens unit L3 (the distance between the lens surface closest to the object side and the lens surface closest to the image side) and the distance between the lenses in the third lens unit L3. If Da3/TD3 is smaller than the lower limit of Conditional Expression (1), the total thickness of the third lens unit L3 is small, which is advantageous in reducing the length of the zoom lens.

However, in order to enable the principal point to be positioned on the front side and to ensure a certain back focus, the thickness of the negative lens has to be increased. As a result, the weight of the third lens unit L3 serving as the optical image-stabilizing lens unit increases, which is undesirable.

On the other hand, if Da3/TD3 is larger than the upper limit of Conditional Expression (1), the total thickness of the third lens unit L3 is large. This increases the length of the zoom lens, which is also undesirable.

Conditional Expression (2) concerns the optical power ratio between the third lens unit L3 and the fourth lens unit L4. If f3/f4 is smaller than the lower limit of Conditional Expression (2), the power of the fourth lens unit L4 is small. This requires the fourth lens unit L4 to move a larger distance during focusing of the zoom lens, and consequently requires a larger space therefor. Thus, the length of the zoom lens increases. Further, variations of aberrations increase, which is also undesirable.

In addition, the amount by which the fourth lens unit L4 is moved to correct image plane variation during image-stabilizing operation increases. This increases variations of aberrations that occur during decentration, which is undesirable. On the other hand, if f3/f4 is larger than the upper limit of Conditional Expression (2), the power of the fourth lens unit L4 is large. This requires the fourth lens unit L4 to move a shorter distance during focusing of the zoom lens. However, the curvatures of the lens surfaces increase, and the number of lenses needs to be increased to suppress generation of aberrations in each lens surface. As a result, the length of the zoom lens increases, which is undesirable.

In the embodiments, in order to more effectively correct aberrations, minimize variations of aberrations that occur during zooming, and obtain high optical performance, it is desirable that the value ranges of Conditional Expressions (1) and (2) be set as follows:

$$0.20 < Da3/TD3 < 0.33 \quad (1a)$$

$$0.30 < f3/f4 < 0.95 \quad (2a)$$

It is further desirable that the value ranges of Conditional Expressions (1a) and (2a) be set as follows:

$$0.2 < Da3/TD3 < 0.3 \quad (1b)$$

$$0.3 < f3/f4 < 0.9 \quad (2b)$$

It is possible to provide a zoom lens having a high zoom ratio, compact size, and high performance, by setting the lens configuration as above.

In addition, it is desirable that the zoom lens according to the embodiments satisfy at least one of the following Conditional Expressions, so that the zoom lens can have advantages corresponding to the following Conditional Expressions:

$$-2.5 < f32/f3 < -0.8 \quad (3)$$

$$10 < vd3n < 35 \quad (4)$$

$$0.57 < \theta gf3n < 0.66 \quad (5)$$

where f32 is the focal length of the second lens, which is a negative lens in the embodiments, of the third lens unit L3, counted from the object side; and vd3n and θgf3n are the Abbe number and the partial dispersion ratio, respectively, of the material of at least one of the two or more negative lenses that constitute the third lens unit L3.

The Abbe number νd and the partial dispersion ratio θgF are expressed as follows:

$$vd = (nd-1)/(nF-nC)$$

$$\theta gF = (nf-nF)/(nF-nC)$$

where ng, nF, nd, and nC are the refractive indices of the material for light with a wavelength of 435.8 nm (g line), light with a wavelength of 486.1 nm (F line), light with a wavelength of 587.6 nm (d line), and light with a wavelength of 656.3 nm (C line), respectively.

Conditional Expression (3) concerns the power distribution of the second negative lens of the third lens unit L3, counted from the object side. If f32/f3 is smaller than the lower limit of Conditional Expression (3), the power of the negative lens is small, and the power of the third lens unit L3 is large. Thus, curvature of field occurs on the under side.

On the other hand, if f32/f3 is larger than the upper limit of Conditional Expression (3), the power of the negative lens is large, and the power of the third lens unit L3 is small. This requires the third lens unit L3 to move a larger distance for zooming. Thus, the length of the zoom lens increases, which is undesirable.

Conditional Expressions (4) and (5) concern the lens material of the negative lens of the third lens unit L3. If vd3n is lower than the lower limit of Conditional Expression (4), the dispersion is large, and the power of the negative lens needs to be decreased to correct axial chromatic aberration. As a result, curvature of field occurs on the under side. On the other hand, if vd3n is higher than the upper limit of Conditional Expression (4), dispersion decreases and axial chromatic aberration is under-corrected.

If θgf3n is lower than the lower limit of Conditional Expression (5), the partial dispersion ratio is small, and the effect of correcting a secondary spectrum of axial chromatic aberration is large. However, such a large correction effect reduces the power of the negative lens, whereby curvature of field occurs on the under side.

On the other hand, if θgf3n is larger than the upper limit of Conditional Expression (5), the partial dispersion ratio is large, and the effect of correcting a secondary spectrum of axial chromatic aberration is small. In particular, the secondary spectrum is under-corrected when the zoom lens is set at a high zoom ratio and the telephoto end.

From the standpoint of aberration correction, it is more desirable that the value ranges of Conditional Expression (3) to (5) be set as follows:

$$-2.2 < f32/f3 < -0.9 \quad (3a)$$

$$11 < vd3n < 34 \quad (4a)$$

$$0.58 < \theta gf3n < 0.65 \quad (5a)$$

It is further desirable that the value ranges of Conditional Expressions (3a), (4a), and (5a) be set as follows:

$$-2.00 < f32/f3 < -0.95 \quad (3b)$$

$$18 < vd3n < 33 \quad (4b)$$

$$0.59 < \theta gf3n < 0.64 \quad (5b)$$

It is possible to provide a zoom lens having a compact size, simple lens configuration, and high optical performance over the entire zoom range and object distance range, by setting the lens configuration as above.

Now, the characteristics of the lens configuration of the lens units according to the embodiments will be described.

The first lens unit L1 has a larger effective lens diameter than the other lens units. Thus, it is desirable that the first lens unit L1 include a smaller number of lenses from the stand point of reducing weight.

The first lens unit L1 has at least one negative lens and two positive lenses.

More specifically, the first lens unit L1 has, in order from the object side to the image side, a cemented lens consisting of a meniscus negative lens with the convex surface facing the object side and a positive lens, and a positive lens. This configuration effectively corrects spherical aberration and chromatic aberration that frequently occur in a zoom lens having higher zoom ratio.

The second lens unit L2 has four independent lenses, namely, two meniscus negative lenses with the convex surfaces facing the object side, a negative lens with the concave surface facing the object side, and a positive lens with the convex surface facing the object side.

This configuration reduces variations of aberrations caused by zooming. In particular, this configuration effectively corrects distortion that occurs when the zoom lens is set at the wide-angle end, and spherical aberration that occurs when the zoom lens is set at the telephoto end.

The third lens unit L3 has, in order from the object side to the image side, a positive lens (a first positive lens) with the convex surface facing the object side, a meniscus negative lens (a first negative lens) with the convex surface facing the object side, and a cemented lens consisting of a meniscus negative lens (a second negative lens) with the convex surface facing the object side and a positive lens (a second positive lens).

The third lens unit L3 has one or more aspherical surfaces. This configuration effectively corrects variations of aberrations caused by zooming.

The use of the cemented lens in the third lens unit L3 serves to minimize variation of chromatic aberration caused by zooming. This also serves to minimize occurrence of aberrations caused by decentration during image-stabilizing operation, in which the entire or a part of the third lens unit L3 is subject to decentration in a direction having a component perpendicular to the optical axis.

The fourth lens unit L4 has a cemented lens consisting of a positive lens with the convex surface facing the object side and a negative lens.

Numerical Examples 1 to 5 corresponding to the first to fifth embodiments of the present invention are shown below. In the numerical examples, i is the optical surface number counted from the object side, Ri is the radius of curvature of the i-th optical surface (the i-th surface), Di is the distance between the i-th surface and the i+1-th surface, Ni is the refractive index of the material of the i-th optical component for the d line, and νi is the Abbe number of the material of the i-th optical component for the d line.

The shape of the aspherical surface is expressed as follows:

$$x=(h^2/R)/[1+[1-(1+k)(h/R)^2]^{1/2}]+Bh^4+Ch^6+Dh^8+Eh^{10}+Fh^{12}+Gh^{14}+Hh^{16}$$

where k is the eccentricity; B, C, D, E, F, G, and H are the aspherical surface coefficients; x is the displacement from the surface vertex, in the optical axis direction and at the height h from the optical axis; and R is the radius of curvature. For example, e-Z means $10^{-z}$. In addition, f is the focal length, Fno is the F number, and ω is the half field angle.

In the numerical examples, the last two surfaces are the surfaces of an optical block, such as a filter or a face plate.

Table 1 lists Conditional Expressions (1) to (5) and the corresponding values in Numerical Examples 1 to 5.

NUMERICAL EXAMPLE 1

| f = 1~13.71 Fno = 2.89~5.57 2ω = 75.2°~6.4° | | | |
|---|---|---|---|
| R1 = 13.578 | D1 = 0.33 | N1 = 1.806100 | ν1 = 33.3 |
| R2 = 5.850 | D2 = 1.02 | N2 = 1.496999 | ν2 = 81.5 |
| R3 = 162.493 | D3 = 0.03 | | |
| R4 = 6.244 | D4 = 0.76 | N3 = 1.696797 | ν3 = 55.5 |
| R5 = 31.628 | D5 = variable | | |
| R6 = 9.845 | D6 = 0.18 | N4 = 1.882997 | ν4 = 40.8 |
| R7 = 1.798 | D7 = 0.45 | | |
| R8 = 6.219 | D8 = 0.15 | N5 = 1.882997 | ν5 = 40.8 |
| R9 = 1.859 | D9 = 0.58 | | |
| R10 = −4.443 | D10 = 0.14 | N6 = 1.806100 | ν6 = 33.3 |
| R11 = 58.969 | D11 = 0.02 | | |
| R12 = 4.038 | D12 = 0.29 | N7 = 1.922860 | ν7 = 18.9 |
| R13 = −14.018 | D13 = variable | | |
| R14 = stop | D14 = variable | | |
| R15* = 1.846 | D15 = 0.62 | N8 = 1.583126 | ν8 = 59.4 |
| R16 = 64.350 | D16 = 0.41 | | |
| R17 = 7.983 | D17 = 0.21 | N9 = 1.581439 | ν9 = 40.8 |
| R18 = 1.994 | D18 = 0.05 | | |
| R19 = 3.003 | D19 = 0.14 | N10 = 2.003300 | ν10 = 28.3 |
| R20 = 1.332 | D20 = 0.39 | N11 = 1.712995 | ν11 = 53.9 |
| R21 = −7.630 | D21 = variable | | |
| R22 = 4.487 | D22 = 0.41 | N12 = 1.754998 | ν12 = 52.3 |
| R23 = −3.750 | D23 = 0.10 | N13 = 1.834000 | ν13 = 37.2 |
| R24 = 19.645 | D24 = variable | | |
| R25 = ∞ | D25 = 0.14 | N14 = 1.516330 | ν14 = 64.1 |
| R26 = ∞ | | | |

| zoom ratio 13.71 | | | |
|---|---|---|---|
| | wide angle | middle | telephoto |
| focal length | 1.00 | 8.07 | 13.71 |
| F number | 2.87 | 3.88 | 5.57 |
| field angle | 37.6 | 12.4 | 3.2 |
| image height | 0.75 | 0.75 | 0.75 |
| total length of lens | 14.8 | 15.9 | 19.7 |
| BF | 1.87 | 3.08 | 1.79 |
| D5 | 0.17 | 5.63 | 6.56 |
| D13 | 3.92 | 0.45 | 0.26 |
| D14 | 1.47 | 0.28 | 0.19 |
| D21 | 1.07 | 1.99 | 4.61 |
| D24 | 1.45 | 3.03 | 1.37 |

| unit | first surface | focal length |
|---|---|---|
| 1 | 1 | 10.71 |
| 2 | 6 | −1.68 |
| 3 | 15 | 3.32 |
| 4 | 22 | 9.29 |

| f = 1~13.71 Fno = 2.89~5.57 2ω = 75.2°~6.4° | | |
|---|---|---|
| | aspherical surface coefficient | |
| R16 | k = −1.12605e−01  B = −1.29138e−02  C = 1.74008e−03 | |
| | D = −8.76570e−03  E = 6.98905e−03  F = 0.00000e+00 | |
| | G = 0.00000e+00  H = 0.00000e+00 | |

NUMERICAL EXAMPLE 2

| f = 1~13.73 Fno = 2.87~5.50 2ω = 75.3°~6.4° | | | |
|---|---|---|---|
| R1 = 13.647 | D1 = 0.33 | N1 = 1.806100 | ν1 = 33.3 |
| R2 = 5.864 | D2 = 1.02 | N2 = 1.496999 | ν2 = 81.5 |
| R3 = 170.503 | D3 = 0.03 | | |
| R4 = 6.267 | D4 = 0.76 | N3 = 1.696797 | ν3 = 55.5 |
| R5 = 32.141 | D5 = variable | | |
| R6 = 9.863 | D6 = 0.18 | N4 = 1.882997 | ν4 = 40.8 |
| R7 = 1.793 | D7 = 0.46 | | |
| R8 = 6.243 | D8 = 0.15 | N5 = 1.882997 | ν5 = 40.8 |
| R9 = 1.862 | D9 = 0.58 | | |
| R10 = −4.514 | D10 = 0.14 | N6 = 1.806100 | ν6 = 33.3 |
| R11 = 50.598 | D11 = 0.02 | | |
| R12 = 3.975 | D12 = 0.29 | N7 = 1.922860 | ν7 = 18.9 |
| R13 = −13.670 | D13 = variable | | |
| R14 = stop | D14 = variable | | |
| R15* = 1.868 | D15 = 0.62 | N8 = 1.583126 | ν8 = 59.4 |
| R16 = 32.615 | D16 = 0.41 | | |
| R17 = 5.511 | D17 = 0.21 | N9 = 1.582673 | ν9 = 46.4 |
| R18 = 2.135 | D18 = 0.04 | | |
| R19 = 3.024 | D19 = 0.14 | N10 = 2.003300 | ν10 = 28.3 |
| R20 = 1.265 | D20 = 0.39 | N11 = 1.696797 | ν11 = 55.5 |
| R21 = −9.816 | D21 = variable | | |
| R22 = 4.511 | D22 = 0.41 | N12 = 1.754998 | ν12 = 52.3 |
| R23 = −4.113 | D23 = 0.10 | N13 = 1.834000 | ν13 = 37.2 |
| R24 = 27.588 | D24 = variable | | |
| R25 = ∞ | D25 = 0.14 | N14 = 1.516330 | ν14 = 64.1 |
| R26 = ∞ | | | |

| zoom ratio 13.73 | | | |
|---|---|---|---|
| | wide angle | middle | telephoto |
| focal length | 1.00 | 7.96 | 13.73 |
| F number | 2.87 | 3.84 | 5.50 |
| field angle | 37.7 | 12.6 | 3.2 |
| image height | 0.75 | 0.75 | 0.75 |
| total length of lens | 14.8 | 16.0 | 19.7 |
| BF | 1.89 | 3.02 | 1.85 |
| D5 | 0.17 | 5.65 | 6.60 |
| D13 | 3.95 | 0.47 | 0.26 |
| D14 | 1.48 | 0.28 | 0.19 |
| D21 | 1.05 | 2.10 | 4.57 |
| D24 | 1.45 | 2.91 | 1.40 |

| unit | first surface | focal length |
|---|---|---|
| 1 | 1 | 10.72 |
| 2 | 6 | −1.71 |
| 3 | 15 | 3.37 |
| 4 | 22 | 8.33 |

| aspherical surface coefficient | | |
|---|---|---|
| R15 | k = −6.27526e−02  B = −1.31808e−02  C = 1.82424e−03 | |
| | D = −8.73109e−03  E = 6.90110e−03  F = 0.00000e+00 | |
| | G = 0.00000e+00  H = 0.00000e+00 | |

NUMERICAL EXAMPLE 3

| f = 1~13.72 Fno = 2.87~5.53 2ω = 75.3°~6.4° | | | |
|---|---|---|---|
| R1 = 13.538 | D1 = 0.33 | N1 = 1.806100 | ν1 = 33.3 |
| R2 = 5.876 | D2 = 1.02 | N2 = 1.496999 | ν2 = 81.5 |
| R3 = 174.059 | D3 = 0.03 | | |
| R4 = 6.224 | D4 = 0.77 | N3 = 1.696797 | ν3 = 55.5 |
| R5 = 31.540 | D5 = variable | | |
| R6 = 9.879 | D6 = 0.18 | N4 = 1.882997 | ν4 = 40.8 |
| R7 = 1.787 | D7 = 0.46 | | |
| R8 = 6.216 | D8 = 0.15 | N5 = 1.882997 | ν5 = 40.8 |
| R9 = 1.861 | D9 = 0.59 | | |
| R10 = −4.409 | D10 = 0.14 | N6 = 1.806100 | ν6 = 33.3 |
| R11 = 61.564 | D11 = 0.02 | | |
| R12 = 4.113 | D12 = 0.37 | N7 = 1.922860 | ν7 = 18.9 |
| R13 = −13.257 | D13 = variable | | |
| R14 = stop | D14 = variable | | |
| R15* = 1.837 | D15 = 0.62 | N8 = 1.583126 | ν8 = 59.4 |
| R16 = 60.337 | D16 = 0.44 | | |
| R17 = 8.527 | D17 = 0.21 | N9 = 1.595509 | ν9 = 39.2 |
| R18 = 1.974 | D18 = 0.05 | | |
| R19 = 3.006 | D19 = 0.14 | N10 = 2.003300 | ν10 = 28.3 |
| R20 = 1.370 | D20 = 0.39 | N11 = 1.712995 | ν11 = 53.9 |
| R21 = −7.728 | D21 = variable | | |
| R22 = 4.418 | D22 = 0.41 | N12 = 1.754998 | ν12 = 52.3 |
| R23 = −3.797 | D23 = 0.10 | N13 = 1.834000 | ν13 = 37.2 |
| R24 = 22.664 | D24 = variable | | |
| R25 = ∞ | D25 = 0.14 | N14 = 1.516330 | ν14 = 64.1 |
| R26 = ∞ | | | |

| zoom ratio 13.72 | | | |
|---|---|---|---|
| | wide angle | middle | telephoto |
| focal length | 1.00 | 8.00 | 13.72 |
| F number | 2.87 | 3.85 | 5.53 |
| field angle | 37.7 | 12.6 | 3.2 |
| image height | 0.75 | 0.75 | 0.75 |
| total length of lens | 14.9 | 16.0 | 19.8 |
| BF | 1.91 | 3.08 | 1.83 |
| D5 | 0.17 | 5.59 | 6.53 |
| D13 | 3.84 | 0.44 | 0.26 |
| D14 | 1.52 | 0.29 | 0.19 |
| D21 | 1.04 | 2.04 | 4.58 |
| D24 | 1.50 | 3.00 | 1.41 |

| unit | first surface | focal length |
|---|---|---|
| 1 | 1 | 10.61 |
| 2 | 6 | −1.68 |
| 3 | 15 | 3.37 |
| 4 | 22 | 8.63 |

| aspherical surface coefficient | | | |
|---|---|---|---|
| R15 | k = −5.82469e−02 | B = −1.38910e−02 | C = 7.57297e−04 |
| | D = −8.91734e−03 | E = 6.88889e−03 | F = 0.00000e+00 |
| | G = 0.00000e+00 | H = 0.00000e+00 | |

NUMERICAL EXAMPLE 4

| f = 1~17.0 Fno = 2.87~5.74 2ω = 75.4°~5.1° | | | |
|---|---|---|---|
| R1 = 13.891 | D1 = 0.33 | N1 = 1.806100 | ν1 = 33.3 |
| R2 = 5.854 | D2 = 1.03 | N2 = 1.496999 | ν2 = 81.5 |
| R3 = 232.443 | D3 = 0.03 | | |
| R4 = 6.680 | D4 = 0.76 | N3 = 1.729157 | ν3 = 54.7 |
| R5 = 49.490 | D5 = variable | | |
| R6 = 12.500 | D6 = 0.18 | N4 = 1.882997 | ν4 = 40.8 |
| R7 = 1.810 | D7 = 0.44 | | |
| R8 = 5.862 | D8 = 0.15 | N5 = 1.882997 | ν5 = 40.8 |
| R9 = 1.872 | D9 = 0.59 | | |
| R10 = −4.349 | D10 = 0.14 | N6 = 1.806100 | ν6 = 33.3 |
| R11 = 51.393 | D11 = 0.02 | | |
| R12 = 4.005 | D12 = 0.33 | N7 = 1.922860 | ν7 = 18.9 |
| R13 = −13.683 | D13 = variable | | |
| R14 = stop | D14 = variable | | |
| R15* = 1.874 | D15 = 0.62 | N8 = 1.583126 | ν8 = 59.4 |
| R16 = 144.162 | D16 = 0.52 | | |
| R17 = 9.133 | D17 = 0.21 | N9 = 1.595509 | ν9 = 39.2 |
| R18 = 2.049 | D18 = 0.04 | | |
| R19 = 3.024 | D19 = 0.14 | N10 = 2.003300 | ν10 = 28.3 |
| R20 = 1.319 | D20 = 0.39 | N11 = 1.712995 | ν11 = 53.9 |
| R21 = −9.408 | D21 = variable | | |
| R22 = 3.978 | D22 = 0.41 | N12 = 1.772499 | ν12 = 49.6 |
| R23 = −4.003 | D23 = 0.10 | N13 = 1.834000 | ν13 = 37.2 |
| R24 = 25.603 | D24 = variable | | |
| R25 = ∞ | D25 = 0.14 | N14 = 1.516330 | ν14 = 64.1 |
| R26 = ∞ | | | |

| zoom ratio 17.0 | | | |
|---|---|---|---|
| | wide angle | middle | telephoto |
| focal length | 1.00 | 8.40 | 17.00 |
| F number | 2.87 | 3.68 | 5.74 |
| field angle | 37.7 | 12.4 | 2.5 |
| image height | 0.75 | 0.75 | 0.75 |
| total length of lens | 15.0 | 16.1 | 20.4 |
| BF | 1.88 | 3.09 | 0.98 |
| D5 | 0.17 | 5.66 | 6.57 |
| D13 | 3.93 | 0.42 | 0.28 |
| D14 | 1.42 | 0.23 | 0.23 |
| D21 | 1.14 | 2.16 | 5.96 |
| D24 | 1.44 | 2.93 | 0.54 |

| unit | first surface | focal length |
|---|---|---|
| 1 | 1 | 10.26 |
| 2 | 6 | −1.67 |
| 3 | 15 | 3.53 |
| 4 | 22 | 6.72 |

| aspherical surface coefficient | | | |
|---|---|---|---|
| R15 | k = −1.28224e−01 | B = −1.20097e−02 | C = 2.31091e−03 |
| | D = −8.60297e−03 | E = 5.31285e−03 | F = 0.00000e+00 |
| | G = 0.00000e+00 | H = 0.00000e+00 | |

NUMERICAL EXAMPLE 5

| f = 1~20.5 Fno = 2.87~5.74 2ω = 75.4°~4.19° | | | |
|---|---|---|---|
| R1 = 13.689 | D1 = 0.33 | N1 = 1.806100 | ν1 = 33.3 |
| R2 = 5.772 | D2 = 1.02 | N2 = 1.496999 | ν2 = 81.5 |
| R3 = 286.543 | D3 = 0.03 | | |
| R4 = 6.590 | D4 = 0.76 | N3 = 1.691002 | ν3 = 54.8 |
| R5 = 57.149 | D5 = variable | | |
| R6 = 12.921 | D6 = 0.18 | N4 = 1.882997 | ν4 = 40.8 |
| R7 = 1.829 | D7 = 0.44 | | |
| R8 = 6.079 | D8 = 0.15 | N5 = 1.834807 | ν5 = 42.7 |
| R9 = 1.881 | D9 = 0.58 | | |
| R10 = −4.380 | D10 = 0.14 | N6 = 1.806100 | ν6 = 33.3 |
| R11 = 40.602 | D11 = 0.02 | | |
| R12 = 4.014 | D12 = 0.28 | N7 = 1.922860 | ν7 = 18.9 |
| R13 = −13.918 | D13 = variable | | |
| R14 = stop | D14 = variable | | |
| R15* = 1.821 | D15 = 0.62 | N8 = 1.583126 | ν8 = 59.4 |
| R16 = −19.233 | D16 = 0.55 | | |
| R17 = 18.158 | D17 = 0.21 | N9 = 1.605620 | ν9 = 43.7 |
| R18 = 2.016 | D18 = 0.05 | | |
| R19 = 3.308 | D19 = 0.12 | N10 = 2.003300 | ν10 = 28.3 |
| R20 = 1.299 | D20 = 0.39 | N11 = 1.712995 | ν11 = 53.9 |
| R21 = −13.296 | D21 = variable | | |
| R22 = 3.503 | D22 = 0.41 | N12 = 1.754998 | ν12 = 52.3 |
| R23 = −4.582 | D23 = 0.10 | N13 = 1.834000 | ν13 = 37.2 |
| R24 = 274.040 | D24 = variable | | |
| R25 = ∞ | D25 = 0.14 | N14 = 1.516330 | ν14 = 64.1 |
| R26 = ∞ | | | |

-continued f = 1~20.5 Fno = 2.87~5.74 2ω = 75.4°~4.19° zoom ratio 20.5

|  | wide angle | middle | telephoto |
|---|---|---|---|
| focal length | 1.00 | 8.46 | 20.50 |
| F number | 2.87 | 4.20 | 5.74 |
| field angle | 37.7 | 5.07 | 2.10 |
| image height | 0.75 | 0.75 | 0.75 |
| total length of lens | 13.15 | 15.33 | 19.58 |
| BF | 1.94 | 3.45 | 1.23 |
| D5 | 0.17 | 5.83 | 7.01 |
| D13 | 3.98 | 0.49 | 0.26 |
| D14 | 1.55 | 0.24 | 0.21 |
| D21 | 1.08 | 2.38 | 5.72 |
| D24 | 1.51 | 3.01 | 0.79 |

| unit | first surface | focal length |
|---|---|---|
| 1 | 1 | 10.40 |
| 2 | 6 | −1.69 |
| 3 | 15 | 3.80 |
| 4 | 22 | 5.09 | aspherical surface coefficient

| R15 | k = −3.07164e−01 | B = −1.04243e−02 | C = 3.00760e−03 |
|---|---|---|---|
|  | D = −9.93328e−03 | E = 7.79403e−03 | F = 0.00000e+00 |
|  | G = 0.00000e+00 | H = 0.00000e+00 |  |

TABLE 1

|  | Numerical Example 1 | Numerical Example 2 | Numerical Example 3 | Numerical Example 4 | Numerical Example 5 |
|---|---|---|---|---|---|
| (1) | 0.23 | 0.23 | 0.24 | 0.27 | 0.28 |
| (2) | 0.36 | 0.41 | 0.39 | 0.52 | 0.75 |
| (3) | −1.40 | −1.82 | −1.29 | −1.27 | −0.99 |
| (4) | 28.3 | 28.3 | 28.3 | 28.3 | 28.3 |
| (5) | 0.598 | 0.598 | 0.598 | 0.598 | 0.598 |

A digital still camera according to an embodiment, which uses the zoom lens according to the above-described embodiments as the imaging optical system, will now be described with reference to FIG. 21.

FIG. 21 shows a camera body 20, an imaging optical system 21 that includes the zoom lens according to any one of the first to fifth embodiments, a solid-state image pickup element (photoelectric conversion element) 22, such as a CCD sensor or a CMOS sensor, which is built in the camera body and receives an image of a subject formed by the imaging optical system 21, a memory 23 that records information of the image of the subject after being subjected to photoelectric conversion by the solid-state image pickup element 22, and a viewfinder 24 that includes a liquid crystal display panel or the like for observing the image of the subject formed on the solid-state image pickup element 22.

It is possible to make a compact image pickup apparatus having high optical performance, by using the zoom lens of the present invention in an image pickup apparatus, such as a digital still camera.

As has been described, according to the above-described embodiments, it is possible to provide a compact zoom lens having high optical performance over the entire zoom range, and an image pickup apparatus having the zoom lens.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-203962 filed Aug. 6, 2007, which is hereby incorporated by reference herein in its entirety.

What is claimed is:

1. A zoom lens comprising, in order from an object side to an image side:
   a first lens unit having positive refractive power;
   a second lens unit having negative refractive power;
   a third lens unit having positive refractive power, the third lens unit having, in order from the object side to the image side, a first positive lens, a first negative lens, and a second negative lens; and
   a fourth lens unit having positive refractive power,
   wherein the zoom lens performs zooming by changing the distance between the lens units,
   wherein the zoom lens satisfies the following conditions:

$0.20 < Da3/TD3 < 0.35$ $0.3 < f3/f4 < 1.0$ where f3 is the focal length of the third lens unit, f4 is the focal length of the fourth lens unit, TD3 is the distance between the surface closest to the object side and the surface closest to the image side in the third lens unit, and Da3 is the distance between the surface of the first positive lens facing the image side and the surface of the first negative lens facing the object side, and
   wherein the following condition is satisfied:

$-2.5 < f32/f3 < -0.8$ where the second lens of the third lens unit, counted from the object side, is the first negative lens, and f32 is the focal length of the first negative lens.

2. The zoom lens according to claim 1, satisfying the following conditions:

$10 < vd3n < 35$ $0.57 < \theta gf3n < 0.66$ where vd3n and θgf3n are the Abbe number and the partial dispersion ratio, respectively, of a material of at least one of the first and second negative lenses.

3. The zoom lens according to claim 1,
   wherein the third lens unit has a second positive lens, the second negative lens and the second positive lens being cemented together to form a cemented lens,
   wherein the third lens unit has, in order from the object side to the image side, the first positive lens, the first negative lens, and the cemented lens,
   wherein the first positive lens is a positive lens with a convex surface facing the object side,
   wherein the first negative lens is a meniscus negative lens with a convex surface facing the object side, and
   wherein the second negative lens is a meniscus negative lens with a convex surface facing the object side.

4. The zoom lens according to claim 1,
   wherein the entire or a part of the third lens unit is moved in a direction having a component perpendicular to an optical axis to change the position of an image of a subject formed by the zoom lens.

5. The zoom lens according to claim 1,
   wherein, when the zoom lens zooms from a wide-angle end to a telephoto end, the first lens unit moves such that the position of the first lens unit at the telephoto end is closer to the object side than the position of the first lens unit at the wide-angle end, the second lens unit moves along a locus convex toward the image side, the third lens unit moves toward the object side, and the fourth lens unit moves along a locus convex toward the object side.

6. The zoom lens according to claim 1, further comprising an aperture stop disposed between the second lens unit and the third lens unit, the aperture stop being moved in an optical axis direction when the zoom lens zooms from the wide-angle end to the telephoto end.

7. The zoom lens according to claim 1, wherein the zoom lens is configured to form an image of an object on a solid-state image pickup element.

8. The zoom lens according to claim 1,
wherein the first positive lens is a positive lens closest to the object side in the third lens unit, and
wherein the first negative lens is a negative lens closest to the object side in the third lens unit.

9. An image pickup apparatus comprising:
the zoom lens according to claim 1; and
a solid-state image pickup element configured to receive an image formed by the zoom lens.

10. A zoom lens comprising, in order from an object side to an image side:
a first lens unit having positive refractive power;
a second lens unit having negative refractive power;
a third lens unit having positive refractive power, the third lens unit having, in order from the object side to the image side, a first positive lens, a first negative lens, and a second negative lens; and
a fourth lens unit having positive refractive power,
wherein the zoom lens performs zooming by changing the distance between the lens units,
wherein the zoom lens satisfies the following conditions:

$$0.20 < Da3/TD3 - 0.35$$

$$0.3 < f3/f4 < 1.0$$

where f3 is the focal length of the third lens unit, f4 is the focal length of the fourth lens unit, TD3 is the distance between the surface closest to the object side and the surface closest to the image side in the third lens unit, and Da3 is the distance between the surface of the first positive lens facing the image side and the surface of the first negative lens facing the object side, and
wherein the following conditions are satisfied:

$$10 < vd3n < 35$$

$$0.57 < \theta gf3n < 0.66$$

where vd3n and θgf3n are the Abbe number and the partial dispersion ratio, respectively, of a material of at least one of the first and second negative lenses.

11. A zoom lens comprising, in order from an object side to an image side:
a first lens unit having positive refractive power;
a second lens unit having negative refractive power;
a third lens unit having positive refractive power, the third lens unit having, in order from the object side to the image side, a first positive lens, a first negative lens, and a second negative lens; and
a fourth lens unit having positive refractive power,
wherein the zoom lens performs zooming by changing the distance between the lens units,
wherein the zoom lens satisfies the following conditions:

$$0.20 < Da3/TD3 < 0.35$$

$$0.3 < f3/f4 < 1.0$$

where f3 is the focal length of the third lens unit, f4 is the focal length of the fourth lens unit, TD3 is the distance between the surface closest to the object side and the surface closest to the image side in the third lens unit, and Da3 is the distance between the surface of the first positive lens facing the image side and the surface of the first negative lens facing the object side,
wherein the third lens unit has a second positive lens, the second negative lens and the second positive lens being cemented together to form a cemented lens,
wherein the third lens unit has, in order from the object side to the image side, the first positive lens, the first negative lens, and the cemented lens,
wherein the first positive lens is a positive lens with a convex surface facing the object side,
wherein the first negative lens is a meniscus negative lens with a convex surface facing the object side, and
wherein the second negative lens is a meniscus negative lens with a convex surface facing the object side.

12. An image pickup apparatus comprising:
the zoom lens according to claim 10; and
a solid-state image pickup element configured to receive an image formed by the zoom lens.

13. An image pickup apparatus comprising:
the zoom lens according to claim 11; and
a solid-state image pickup element configured to receive an image formed by the zoom lens.

* * * * *